United States Patent
Enkababian et al.

(10) Patent No.: US 10,422,220 B2
(45) Date of Patent: Sep. 24, 2019

(54) METHOD AND SYSTEMS FOR ANALYSIS OF HYDRAULICALLY-FRACTURED RESERVOIRS

(71) Applicant: Schlumberger Technology Corporation, Sugar Land, TX (US)

(72) Inventors: Philippe Enkababian, Richmond, TX (US); Dmitriy Potapenko, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 507 days.

(21) Appl. No.: 15/145,472

(22) Filed: May 3, 2016

(65) Prior Publication Data

US 2017/0321548 A1    Nov. 9, 2017

(51) Int. Cl.
| | | |
|---|---|---|
| *E21B 49/08* | (2006.01) | |
| *E21B 33/12* | (2006.01) | |
| *E21B 34/14* | (2006.01) | |
| *E21B 41/00* | (2006.01) | |
| *E21B 43/26* | (2006.01) | |
| *E21B 47/06* | (2012.01) | |
| *E21B 47/10* | (2012.01) | |

(Continued)

(52) U.S. Cl.
CPC .......... *E21B 49/086* (2013.01); *E21B 33/12* (2013.01); *E21B 34/14* (2013.01); *E21B 41/0092* (2013.01); *E21B 43/26* (2013.01); *E21B 47/06* (2013.01); *E21B 47/10* (2013.01); *E21B 2034/007* (2013.01); *G01F 1/74* (2013.01); *G06F 17/5009* (2013.01); *G06F 2217/34* (2013.01)

(58) Field of Classification Search
CPC ........ E21B 49/086; E21B 33/12; E21B 34/14; E21B 41/0092; E21B 43/26; E21B 47/06; E21B 47/10; E21B 2034/007; E21B 43/12; E21B 43/17; E21B 43/14; E21B 49/08; E21B 21/08; G06Q 30/02; G01V 9/00; G06F 17/5009; G01F 1/74
See application file for complete search history.

(56) References Cited

U.S. PATENT DOCUMENTS

| | | |
|---|---|---|
| 5,732,776 A | 3/1998 | Tubel et al. |
| 8,536,524 B2 | 9/2013 | Pomerantz et al. |

(Continued)

FOREIGN PATENT DOCUMENTS

WO    WO2015113019 A1    7/2015

OTHER PUBLICATIONS

K. Bendiksen et al, "The dynamic two-fluid model OLGA: theory and application," SPE Prod. Eng., 1991, pp. 171-180.

(Continued)

*Primary Examiner* — Yong-Suk Ro
(74) *Attorney, Agent, or Firm* — Cameron R. Sneddon

(57) ABSTRACT

Various methods and well systems are provided for characterizing a hydraulically-fractured hydrocarbon-bearing formation that is traversed by a well partitioned into a number of intervals. The methods and well systems analyze surface flow characteristics of fluid that flows from the well (for example, using a multiphase flow meter) in order to characterize local formation properties for one or more intervals for one or more intervals (or other sections) of the well.

42 Claims, 16 Drawing Sheets

(51) Int. Cl.
*E21B 34/00* (2006.01)
*G01F 1/74* (2006.01)
*G06F 17/50* (2006.01)

(56) References Cited

U.S. PATENT DOCUMENTS

| | | |
|---|---|---|
| 2006/0113077 A1 | 6/2006 | Willberg et al. |
| 2008/0093073 A1 | 4/2008 | Bustos et al. |
| 2008/0210470 A1 | 9/2008 | Stewart |
| 2009/0234584 A1 | 9/2009 | Casey et al. |
| 2012/0125627 A1 | 5/2012 | George et al. |
| 2012/0181034 A1 | 7/2012 | Bour et al. |
| 2015/0285034 A1* | 10/2015 | Frisby .................. E21B 34/14 166/373 |
| 2015/0324818 A1 | 11/2015 | Lachance et al. |
| 2016/0024902 A1 | 1/2016 | Richter et al. |

OTHER PUBLICATIONS

International Patent Application No. PCT/US2016/014424 filed Jan. 22, 2016; 83 pages.

International Search report and Written Opinion issued in the related PCT Application PCT/US2017/030709, dated Sep. 7, 2017 (24 pages).

International Preliminary Report on Patentabitliy issued in the related PCT Application PCT/US2017/030709, dated Nov. 15, 2018 (21 pages).

\* cited by examiner

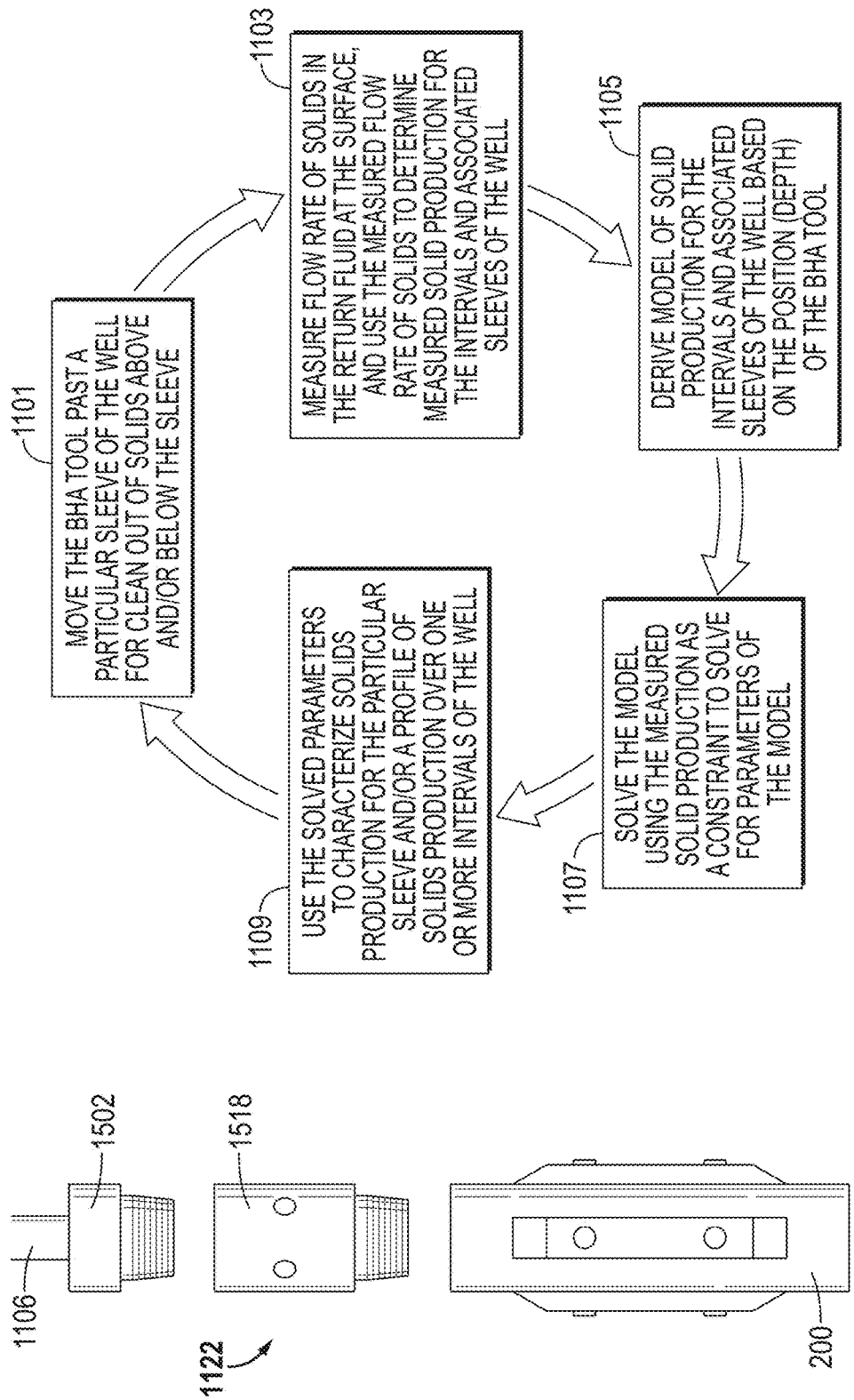

METHOD AND SYSTEMS FOR ANALYSIS OF HYDRAULICALLY-FRACTURED RESERVOIRS

BACKGROUND

Well completions that produce hydrocarbons trapped in tight reservoirs are generally complex and expensive to install and maintain. In recognition of these complexities and expenses, added emphasis has been placed on efficiencies associated with these well completions and their maintenance over the life of the well.

It is commonplace for a well that produces hydrocarbons trapped in tight reservoirs to be partitioned into a number of intervals (also referred to as stages or zones) spaced along the length of the well. Short sections of unperforated production tubing (such as liner or casing sections) can be located between intervals to support isolation of the respective intervals. During well completion, hydraulic fracturing operations can be carried out over the intervals of the well. The hydraulic fracturing operations direct fracturing fluid under high pressure through fracturing sleeves or liner/casing perforations into the adjacent formation, which causes fracturing of the reservoir rock of the adjacent formation that is intended to release oil or gas trapped in the reservoir rock such that it flows into the well for easier production. The fracturing fluid typically contains a proppant (such as sand) that aids in holding the fractures open after the fracturing application has been completed.

Note that not all intervals of the well can contribute equally to the production of hydrocarbons from the well as the petrophysical and geomechanical properties of the reservoir can vary along the length of the well. Current workflows used to evaluate the productivity of individual intervals of the well are based on two main techniques. The first technique, commonly described as production logging, is based on the downhole measurements of fluid rates using spinners and pressure measurement. This first technique requires a production logging tool to be run in the well, thus increasing the cost of the well. The second technique is based on the measurement of tracer concentration. Different tracers are injected into the reservoir with the fracturing fluid over the intervals of the well. The tracers are produced from well with the fracturing fluid and/or hydrocarbons during the initial production of the well. The amount of each given tracer that is produced is a function of the flow contribution of the respective interval in which the given tracer was placed. The use of the multiple different tracers allows for the evaluation of the flow contributions over the number of intervals of the well. Beyond the limitation inherent to the interpretation of the produced fluids (including the tracers, the fracturing fluid and/or hydrocarbons), this second technique has a limitation in the number of tracers that can be placed into the intervals of a single well as well as the detection of the tracers in the produced fluids.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Illustrative embodiments of the present disclosure are directed to a method and system for characterizing a hydraulically-fractured hydrocarbon-bearing formation that is traversed by a well partitioned into a number of intervals. The methods and well systems analyze surface flow characteristics of fluid that flows from the well (for example, using a multiphase flow meter) in order to characterize local formation properties for one or more intervals (or other sections) of the well.

In aspects, a method for characterizing a hydraulically-fractured hydrocarbon-bearing formation that is traversed by a well having a plurality of fracturing sleeves employs downhole tool to open (or close) a set of one or more fracturing sleeves of the well. After opening or closing the set of one or more fracturing sleeves of the well, surface flow characteristics of produced fluid that flows from the well back to a surface-located facility can be analyzed, and at least one local formation property that characterizes the hydraulically-fractured formation adjacent the set of one or more fracturing sleeves of the well can be derived based on such surface flow characteristics.

In embodiments, the surface flow characteristics of the produced fluid can be analyzed to determine at least one flow contribution that flows through the set of one or more fracturing sleeves of the well, and such flow contribution can be used to derive the at least one local formation property that characterizes the hydraulically-fractured formation adjacent the set of one or more fracturing sleeves of the well.

In further embodiments, the surface flow characteristics of the produced fluid can be analyzed together with downhole pressure measurements of the produced fluid in order to determine at least one flow contribution that flows through the set of one or more fracturing sleeves of the well. Modeling and nodal analysis can be used to analyze the surface flow characteristics of the produced fluid and the downhole pressure measurements of the produced fluid in order to determine the at least one flow contribution that flows through the set of one or more fracturing sleeves of the well.

In yet further embodiments, the at least one local formation property that characterizes the hydraulically-fractured formation adjacent the set of one or more fracturing sleeves of the well can be evaluated in order to determine whether to selectively close (or open) the set of one or more fracturing sleeves of the well. In the event that the at least one local formation property that characterizes the hydraulically-fractured formation adjacent the set of one or more fracturing sleeves of the well provides an indication of a depleted formation or formation or well damage or other suitable condition, the set of one or more fracturing sleeves of the well can be closed if open or remain closed if closed. Otherwise, the set of one or more fracturing sleeves of the well can be opened if closed or remain open if opened.

The operations may be repeated for at least one additional set of one or more fracturing sleeves of the well in order to derive at least one local formation property that characterizes the hydraulically-fractured formation adjacent the at least one additional set of one or more fracturing sleeves of the well.

In aspects, a method for characterizing a hydraulically-fractured hydrocarbon-bearing formation that is traversed by a well that is partitioned into a plurality of well intervals employs a downhole packer to isolate a set of one or more well intervals that are upstream from the packer from one or more well intervals that are downstream from the packer. In this configuration, the set of one or more well intervals that are upstream from the packer are in fluid communication with a surface facility, while the one or more well intervals downstream from the packer are fluidly isolated and decoupled from the surface facility. After isolating the set of one or more well intervals that are upstream from the packer, surface flow characteristics of produced fluid that flows from the well back to the surface-located facility can be analyzed, and at least one local formation property that characterize the hydraulically-fractured formation adjacent the set of one or more well intervals that are upstream from the packer can be derived based on such surface flow characteristics.

In embodiments, the surface flow characteristics of the produced fluid can be analyzed to determine at least one flow contribution that flows through the set of one or more well intervals that are upstream from the packer, and such flow contribution can be used to derive the at least one local formation property that characterizes the hydraulically-fractured formation adjacent the set of one or more well intervals that are upstream from the packer.

In further embodiments, the surface flow characteristics of the produced fluid can be analyzed together with downhole pressure measurements of the produced fluid in order to determine at least one flow contribution that flows through the set of one or more well intervals that upstream from the packer. Modeling and nodal analysis can be used to analyze the surface flow characteristics of the produced fluid and the downhole pressure measurements of the produced fluid in order to determine the at least one flow contribution that flows through the set of one or more well intervals that are upstream from the packer.

In yet further embodiments, the at least one local formation property that characterizes the hydraulically-fractured formation adjacent the set of one or more well intervals that are upstream from the packer can be evaluated in order to determine whether to selectively seal the set of one or more well intervals that upstream from the packer by the application of a sealing agent.

The operations can be repeated to isolate at least one additional set of one or more well intervals in order to derive at least one local formation property that characterizes the hydraulically-fractured formation adjacent the at least one additional set of one or more well intervals.

In aspects, a method for characterizing a hydraulically-fractured hydrocarbon-bearing formation that is traversed by a well that is partitioned into a plurality of well intervals employs a downhole choking packer that is located in a particular well interval. After locating the choking packer in the particular well interval, surface flow characteristics of produced fluid that flows from the well back to the surface-located facility can be analyzed, and at least one local formation property that characterizes the hydraulically-fractured formation adjacent the particular well interval can be derived based on such surface flow characteristics.

In embodiments, the surface flow characteristics of the produced fluid can be analyzed together with downhole differential pressure measurements of the produced fluid across the choking packer in order to derive the at least one local formation property that characterize the hydraulically-fractured formation adjacent the particular well interval.

The operations can be repeated with the choking packer located in at least one additional well interval in order to derive at least one local formation property that characterizes the hydraulically-fractured formation adjacent the at least one additional well interval.

In further aspects, a method for characterizing a hydraulically-fractured hydrocarbon-bearing formation that is traversed by a well that is partitioned into a plurality of well intervals employs a data analyzer that analyzes surface flow characteristics of produced fluid that flows from the well to the surface-located facility over time in order to detect slug flow in the produced fluid and determine properties of such slug flow. The data analyzer can analyze the properties of the flow (such as amplitude, frequency and period characteristic of the slug flow) or the surface flow characteristics of produced fluid over time to determine one or more well intervals that contribute to such slug flow. The data analyzer can store data in computer memory that identifies the one or more well intervals that contribute to such slug flow.

In one embodiment, the data analyzer can be a transient multiphase wellbore flow simulator that analyzes the properties of such slug flow or the surface flow characteristics of produced fluid over time to determine one or more well intervals that contribute to such flow.

In further embodiments, the transient multiphase wellbore flow simulator can derive a solution using properties of the flow (including individual phase flowrates observed at the surface) as input data, calculate a wellbore volume from the solution, and estimate properties (such as location, cross-section and the total length) of the well interval that contributes to the flow based on the wellbore volume.

In still further embodiments, the transient multiphase wellbore flow simulator can determine individual phase flow rates at the surface together with other determined parameters (such as downhole pressure(s), well-head pressure(s)), other fluid properties, etc.) for varying geometrical properties of the well, compare these determined parameters for the varying geometrical properties of the well to corresponding measured parameters to determine whether a sufficient match is obtained, estimate the geometry of the well when the sufficient match is obtained, and estimate properties (such as location, cross-section and the total length) of the well interval that contributes to the slug flow based on the estimated geometry of the well.

In further aspects, a method is provided for characterizing a hydraulically-fractured hydrocarbon-bearing formation that is traversed by a well that is partitioned into a plurality of well intervals. The method involves locating a downhole tool in a particular well interval where the downhole tool circulates fluid for clean out of the particular well interval. Surface flow characteristics of produced fluid that flows from the well back to a surface-located facility are analyzed. At least one property that characterize solids production from the particular well interval is derived based on such surface flow characteristics.

The at least one property can characterize solids production from fractures that are in fluid communication with a particular sliding sleeve. The at least one property can further characterize a profile of solids production from fractures that are in fluid communication with a number of sliding sleeves of the well.

The at least one property can also characterize deposited solids that are near a particular sliding sleeve. The at least one property can further characterize a profile of deposited solids that are near a number of sliding sleeves of the well.

In these methods and well systems, the surface flow characteristics of the produced fluid can be measured by a surface-located multiphase flow meter. The surface flow characteristics of the produce fluid can include flow rates for different phases of the produced fluid. The different phases of the produced fluid can be selected from the group consisting of: an oil phase, a gas phase, a water phase and a solid phase.

Figure 1A:
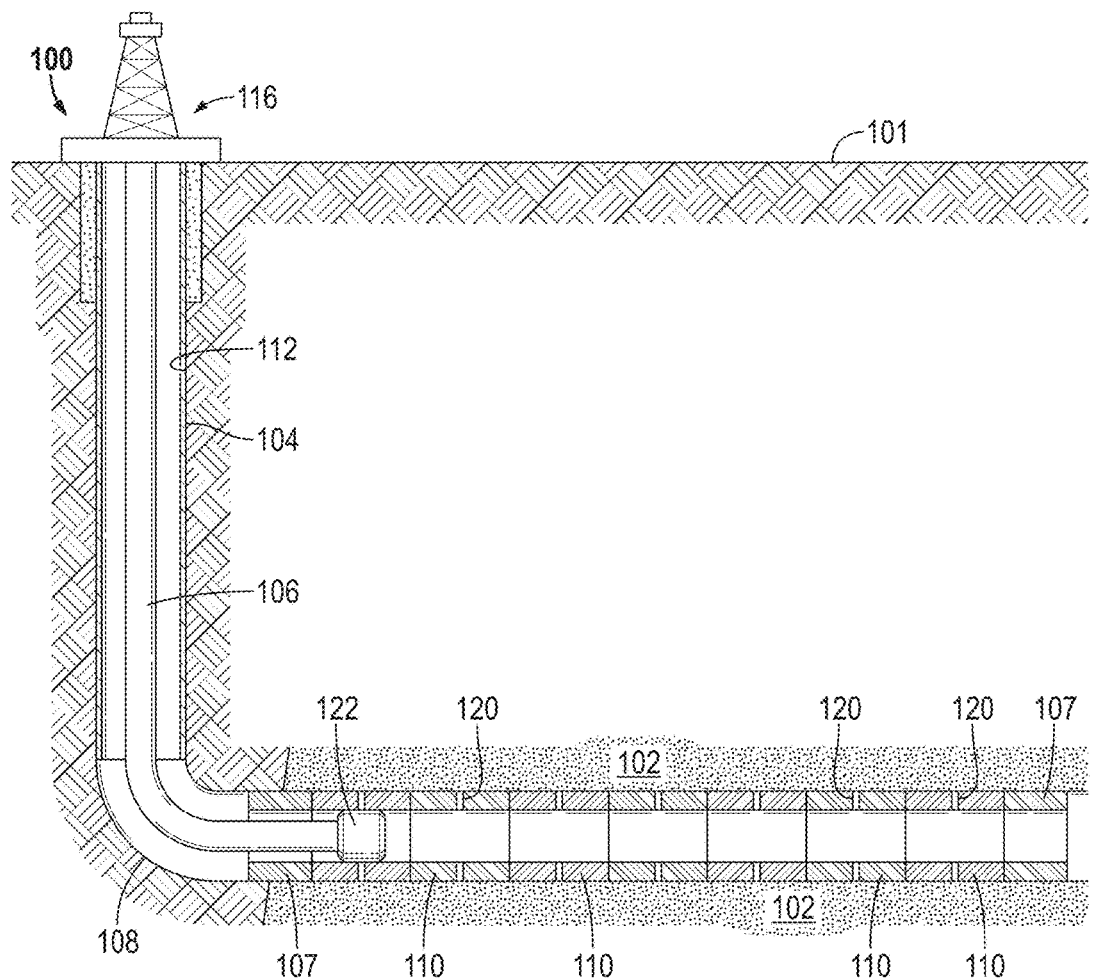
FIG. 1A is a schematic illustration of a well that traverses a hydraulically-fractured hydrocarbon-bearing reservoir. The well includes a horizontal section with production tubing that includes a number of fracturing sleeves that are offset from one another along the length of the horizontal section of the well. A downhole shifting tool can be run in the well and configured to selectively engage one of the fracturing sleeves. In the engaged configuration, the shifting tool can be operated to open or close the ports of the fracturing sleeve.
Figure 1B:
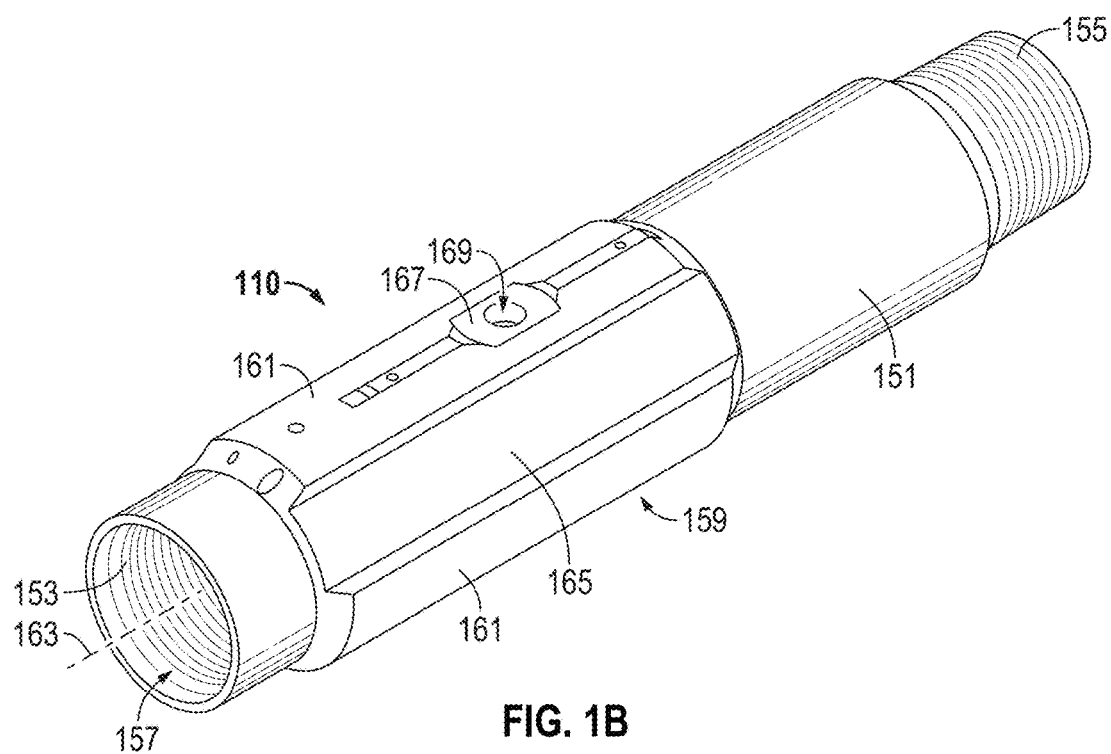
FIG. 1B is a perspective view of an exemplary fracturing sleeve that can be part of the well of FIG. 1A.

Figure lE is a cross-sectional view of the fracturing sleeve of FIG. 1B with a shifting tool located therein.

Figure 2:
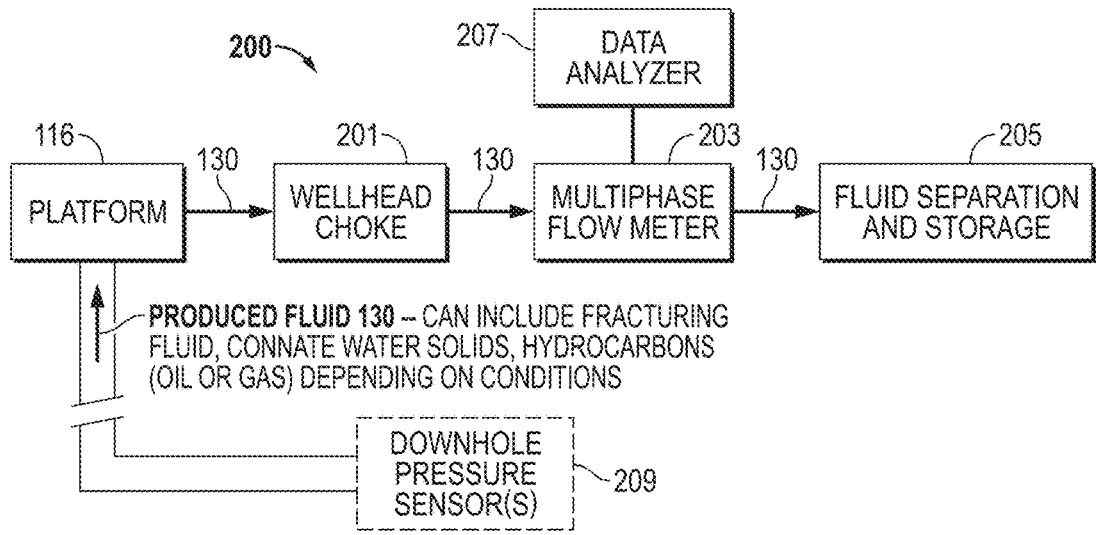

FIG. 2 is a functional block diagram of a surface facility that analyzes flow characteristics of produced fluid that flows from the well to the surface after opening (or closing) a set of one or more fracturing sleeves in order to characterize local properties of the formation adjacent the set of one or more fracturing sleeves.

Figure 3:
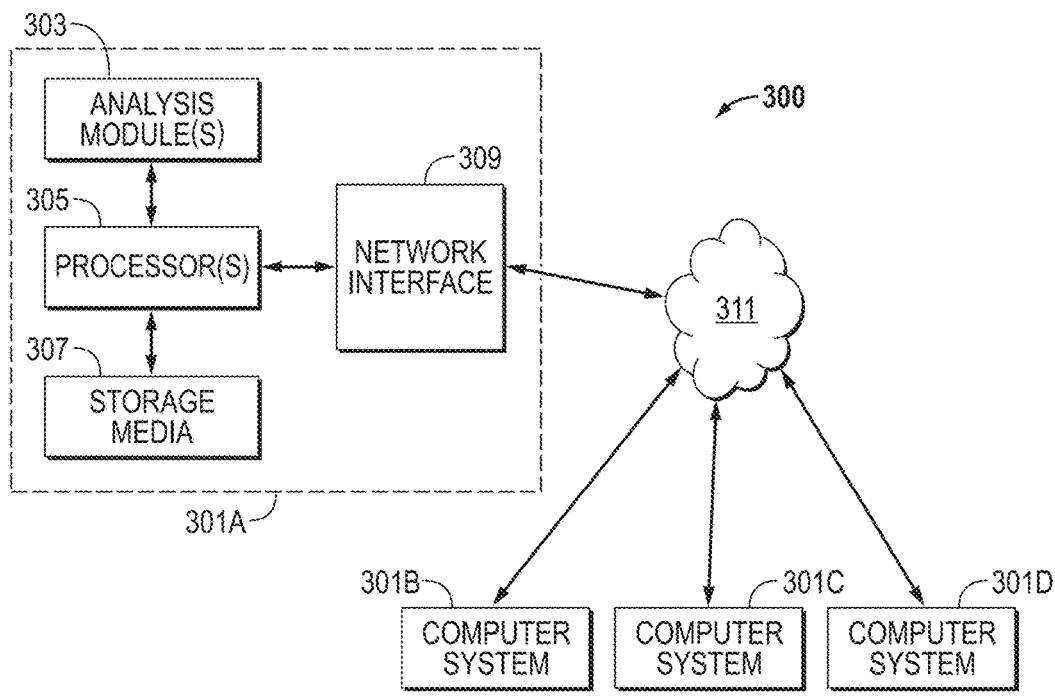

FIG. 3 shows an example computing system that can be used to implement the data analyzer of FIG. 2.

Figure 4A:
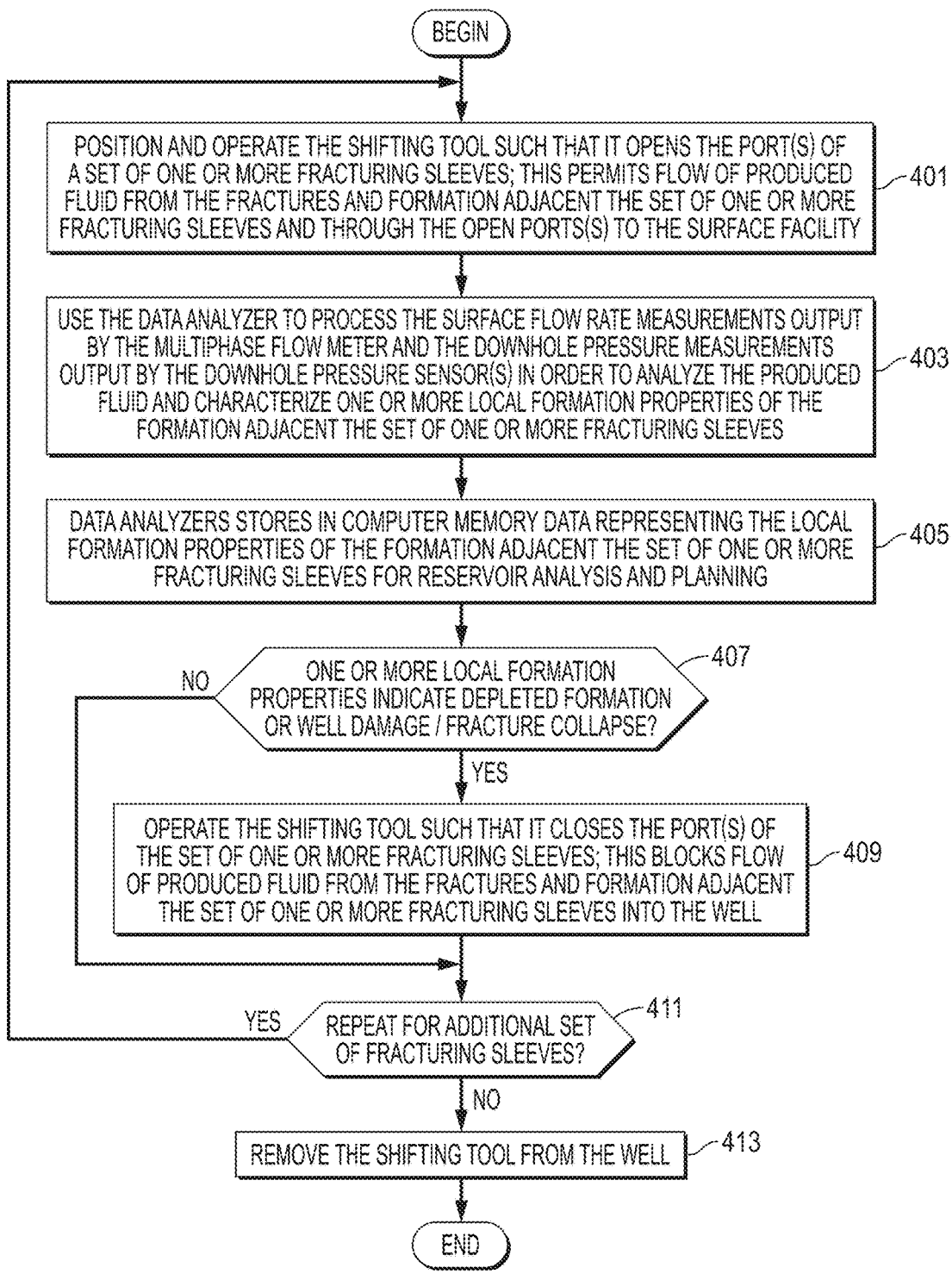

FIG. 4A is a flowchart illustrating an exemplary workflow that opens a set of one or more fracturing sleeves and analyzes produced fluid that flows from the well to the surface facility of FIG. 2 after opening the set of one or more fracturing sleeves in order to characterize local properties of the formation adjacent the set of one or more fracturing sleeves. FIG. 4A shows that the operations can be repeated for additional sets of one or more fracturing sleeves in order to characterize local properties of the formation adjacent the additional sets of one or more fracturing sleeves.

Figure 4B:
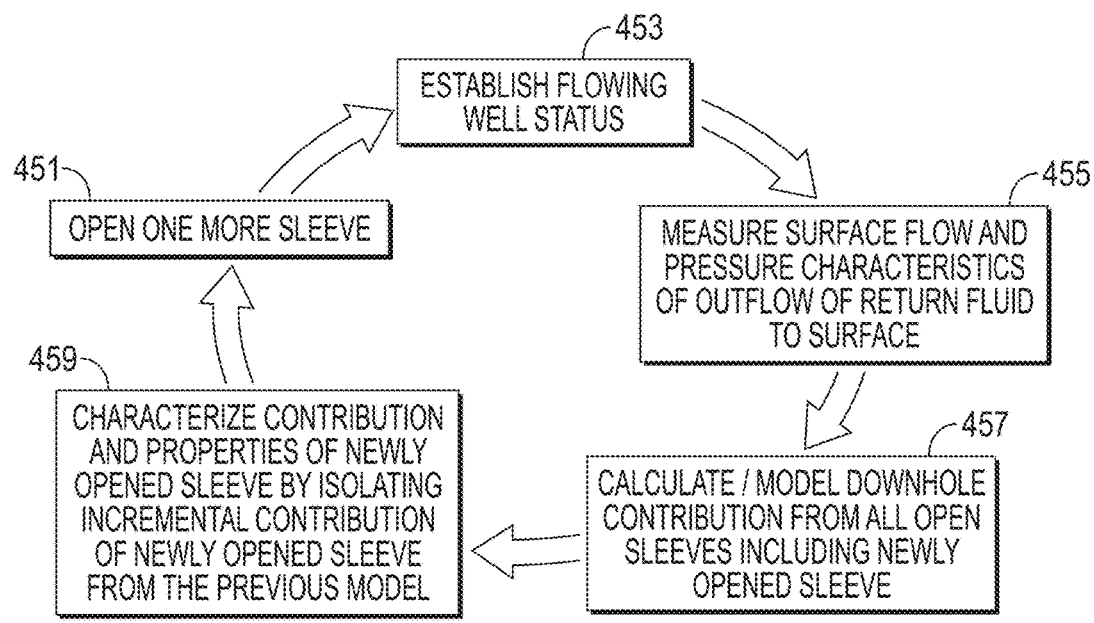

FIG. 4B is a flowchart illustrating detailed operations carried out by the data analyzer of FIG. 2 that measure the inflow of produce fluid that flows through a set of newly-opened fracturing sleeves and characterize local properties of the formation adjacent the set of newly-opened fracturing sleeves.

Figure 5A:
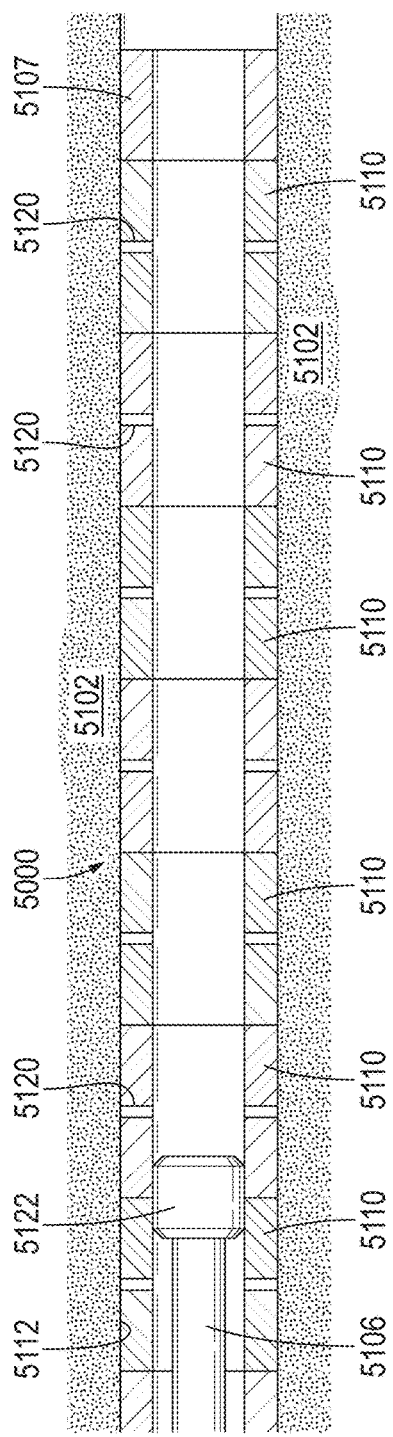

FIG. 5A is a schematic illustration of the horizontal section of a well that traverses a hydraulically-fractured hydrocarbon-bearing reservoir. The horizontal section includes production tubing (e.g., a production liner and casing) that defines a number of well intervals each having perforation zones that allow fluid communication between the hydraulically fractured hydrocarbon-bearing formation and the interior space of the production tubing. A resettable packer tool can be run in the well and configured to selectively isolate a set of one or more well intervals that are in fluid communication with the surface facility of FIG. 2 (from other well intervals that are not in fluid communication with the surface facility).

Figure 5B:
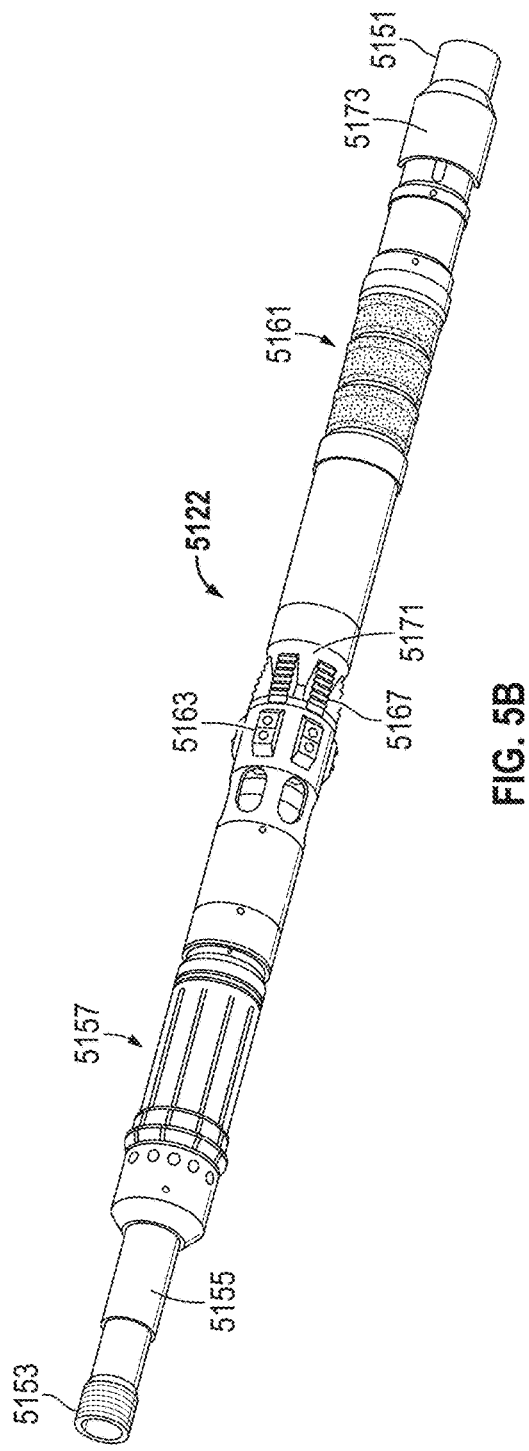

FIG. 5B is a perspective view of an exemplary resettable packer tool suitable for use in the well of FIG. 5A.

Figure 5C:
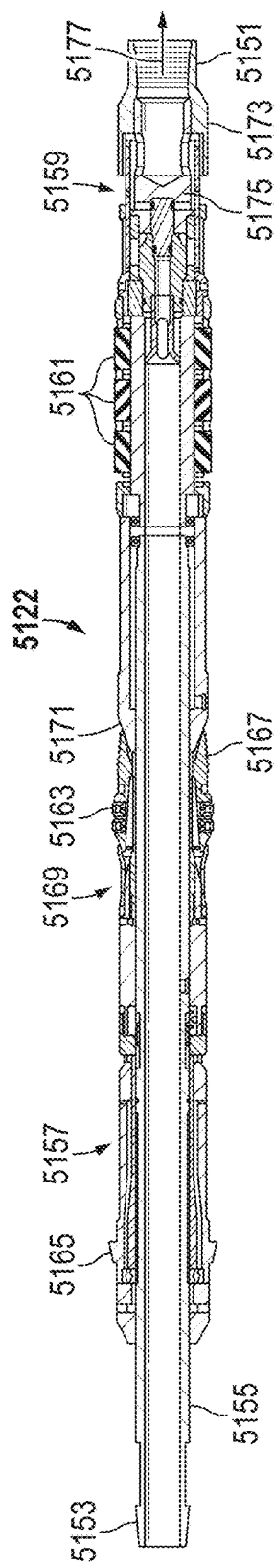

FIG. 5C is a cross-section view of the resettable packer tool of FIG. 5B.

Figure 5D:
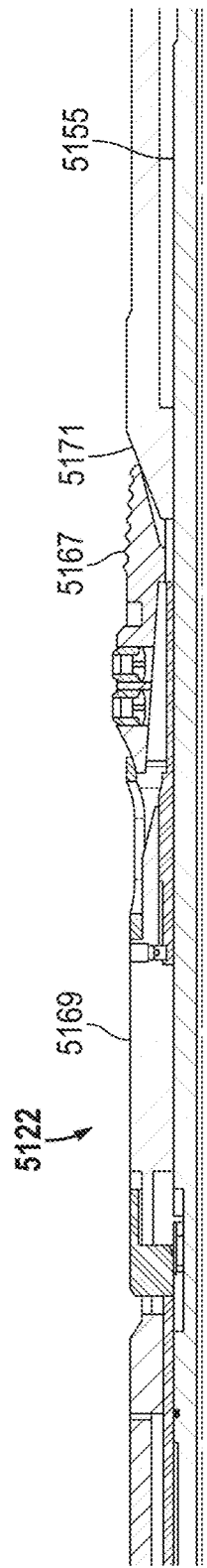

FIG. 5D is a cross-section view of the drive housing of the resettable packer tool of FIGS. 5B and 5C.

Figure 6A:
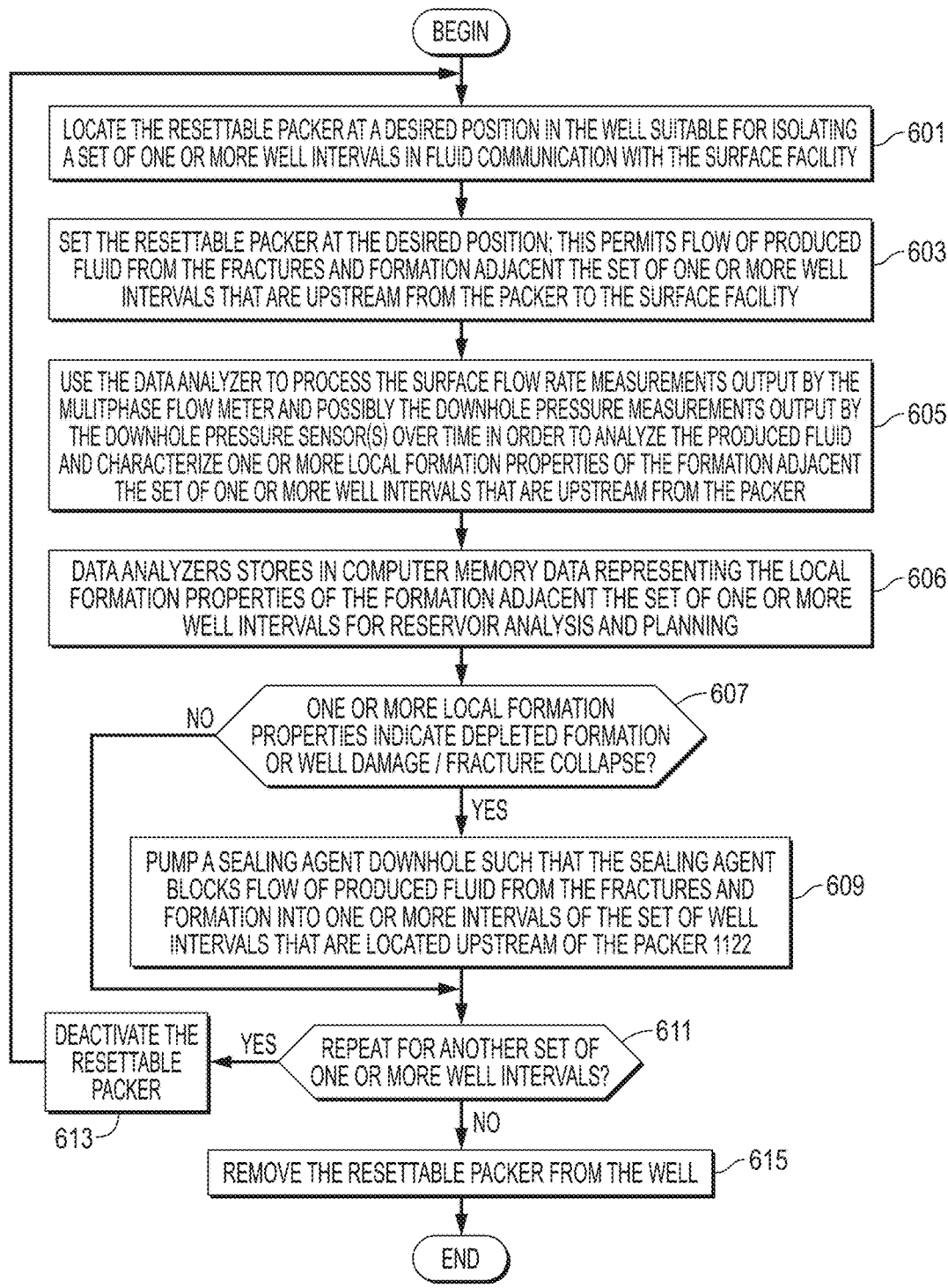

FIG. 6A is a flowchart illustrating exemplary operations that configures the resettable packer to isolate a set of one or more well intervals that are in fluid communication with the surface facility of FIG. 2 and analyzes produced fluid that flows from the well to the surface facility after configuring the resettable packer in order to characterize local properties of the formation adjacent particular well intervals.

Figure 6B:
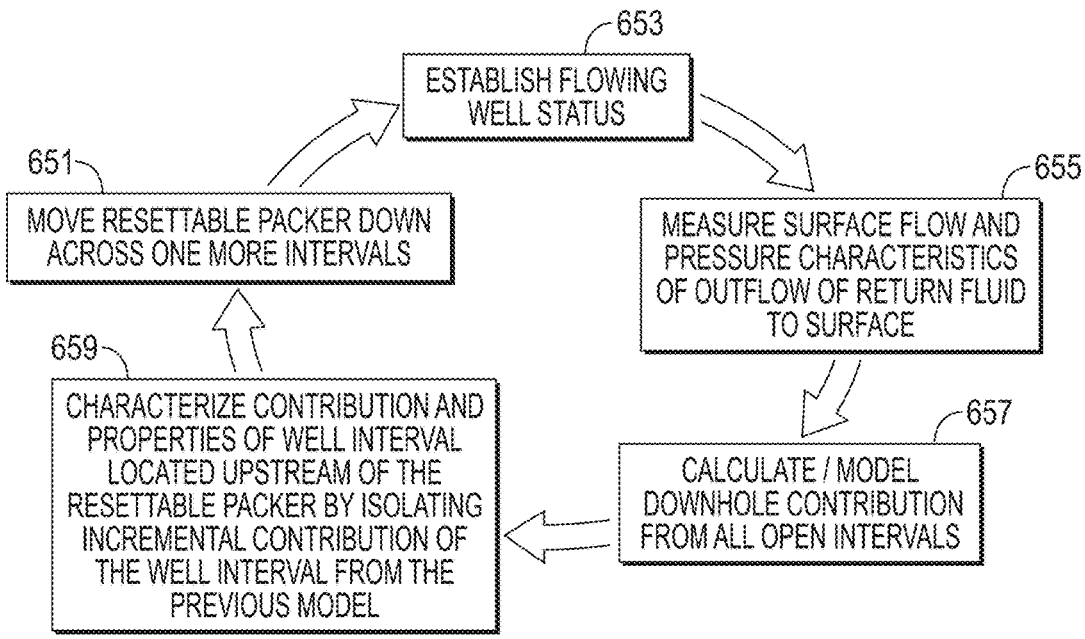

FIG. 6B is a flowchart illustrating detailed operations carried out by the data analyzer of FIG. 2 that measure the inflow of produce fluid that flows from the isolated set of one or more well intervals and characterize local properties of the formation adjacent particular well interval.

Figure 7B:
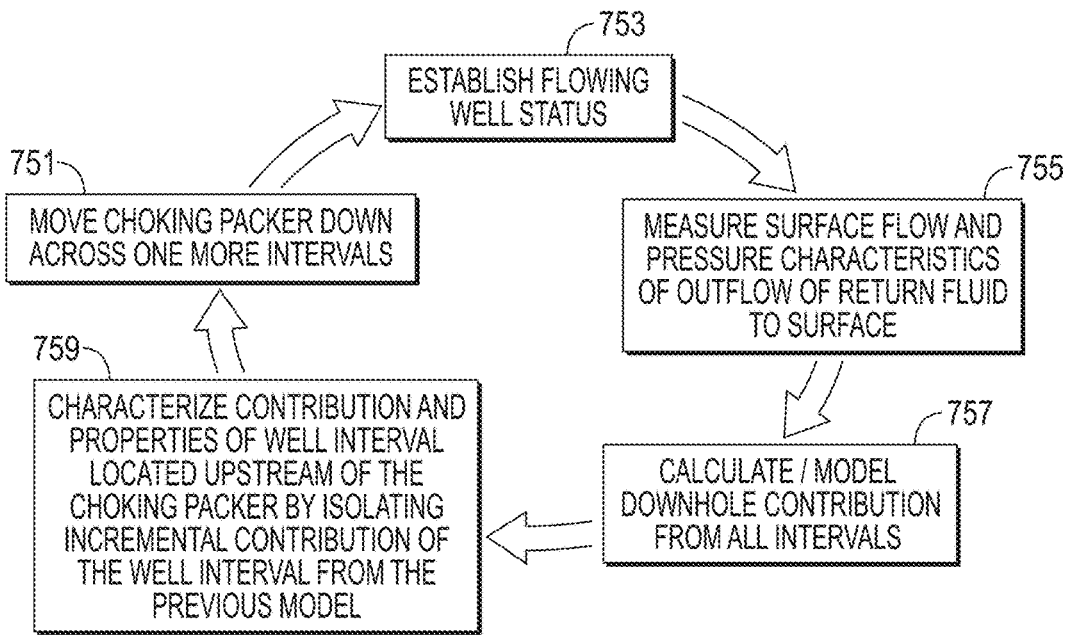
Figure 7A:
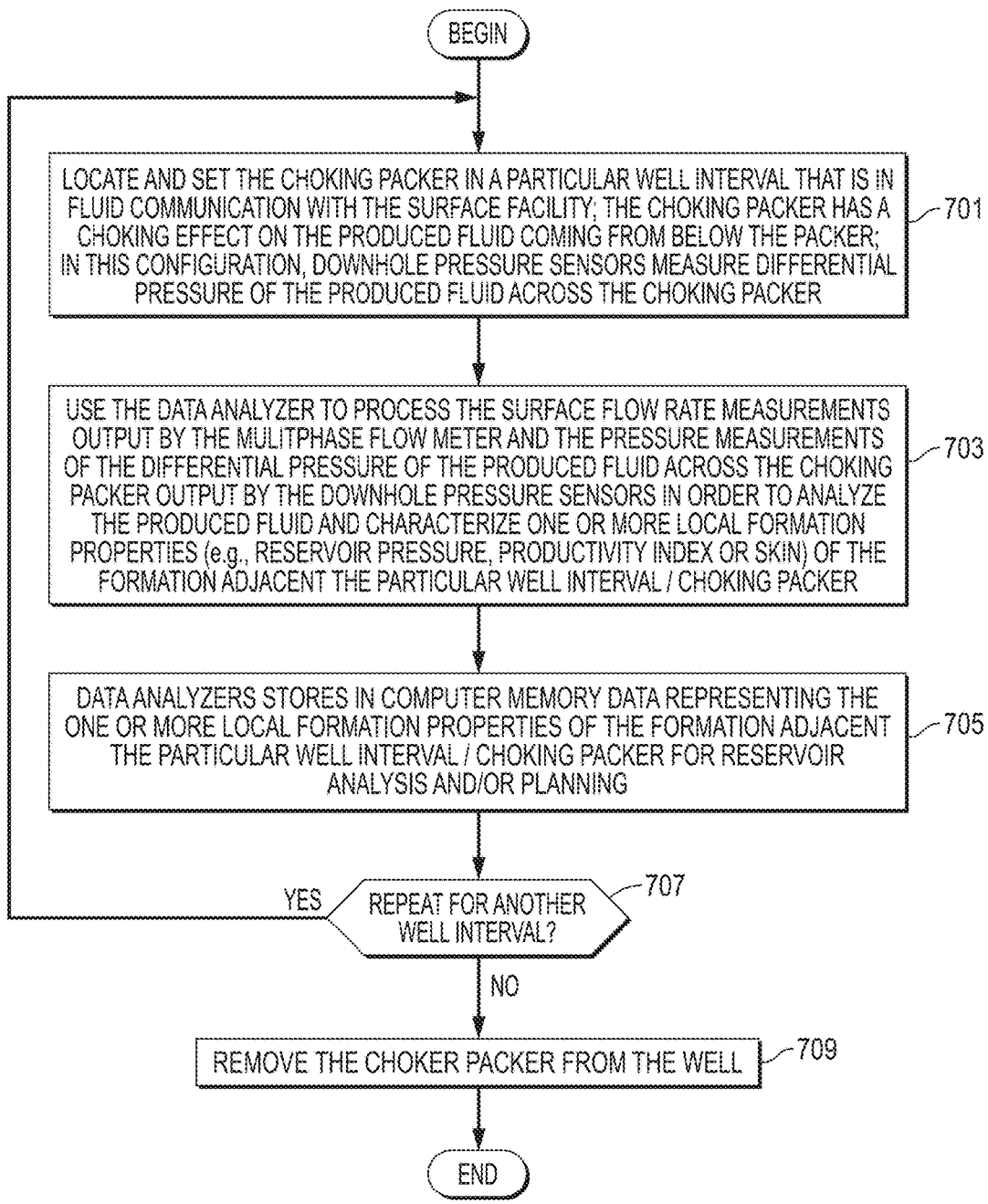

FIG. 7A is a flowchart illustrating exemplary operations that locates a choking packer in a particular well interval that is in fluid communication with the surface facility of FIG. 2 and analyzes produced fluid that flows from the well to the surface facility after locating the choking packer in order to characterize local properties of the formation adjacent the particular well interval. FIG. 7A shows that the operations can be repeated for other well intervals in order to characterize local properties of the formation adjacent the other well intervals.

FIG. 7B is a flowchart illustrating detailed operations carried out by the data analyzer of FIG. 2 that measure the inflow of produce fluid that flows from the particular interval corresponding to the location of the choking packer and characterize local properties of the formation adjacent this particular interval.

Figure 8:
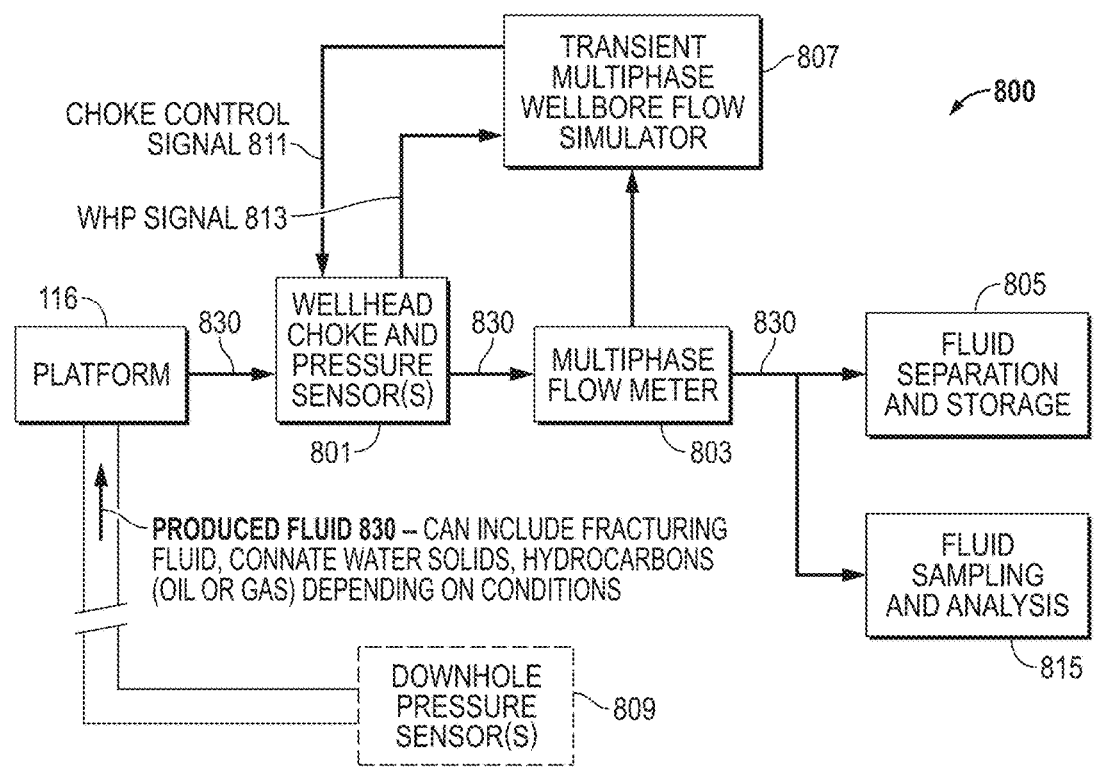

FIG. 8 is a functional block diagram of a surface facility that analyzes flow characteristics of produced fluid that flows from a well traversing a hydraulically-fractured hydrocarbon-bearing formation to the surface in order to detect and characterize slug flow originating from one or more well intervals for reservoir analysis and planning.

Figure 9:
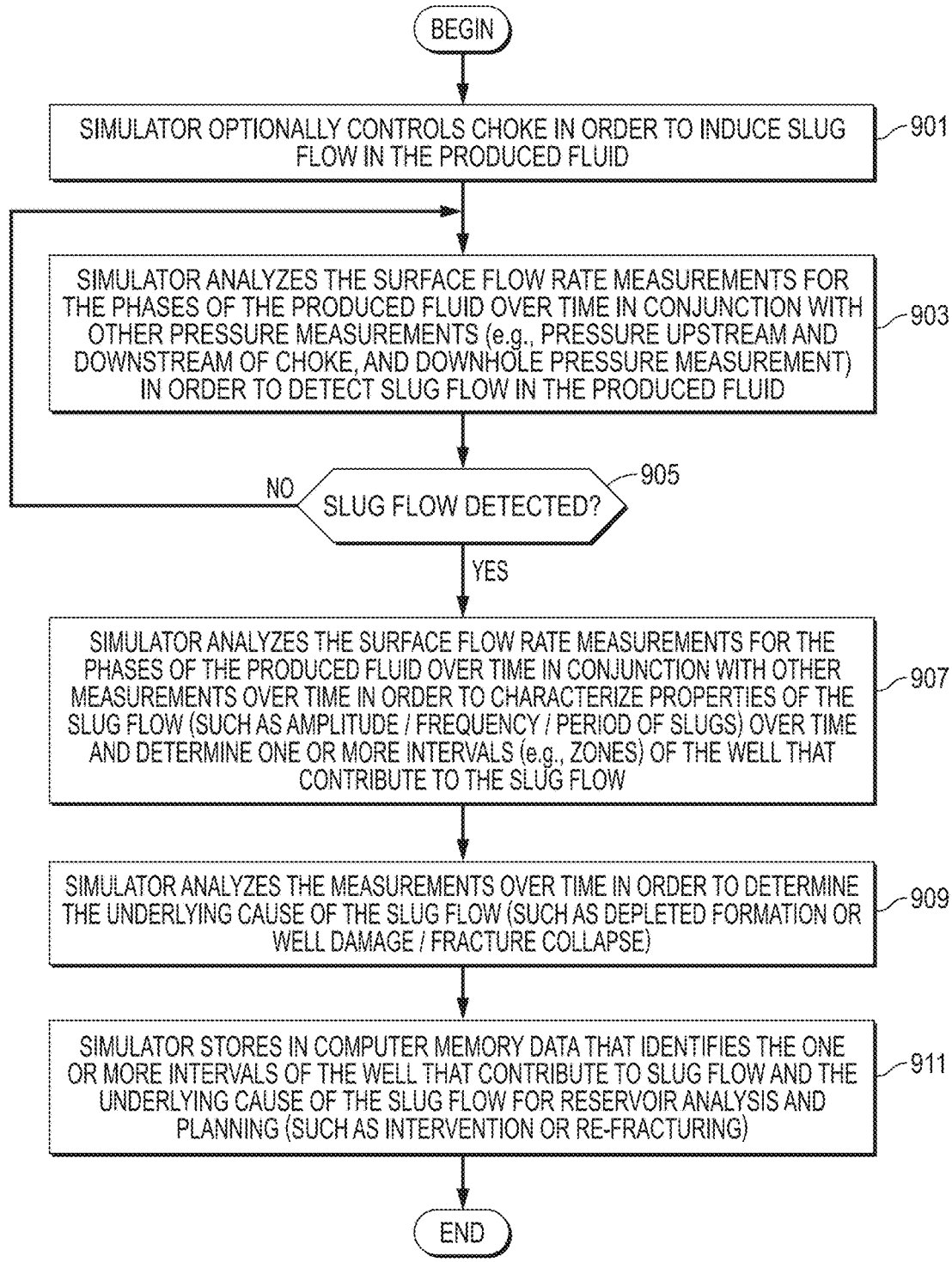

FIG. 9 is a flowchart illustrating an example workflow carried out by the transient multiphase wellbore flow simulator of FIG. 8 that analyzes flow characteristics of produced fluid at the surface in order to detect slug flow, characterize the slug flow originating from one or more well intervals, determine the underlying cause of such slug flow, and store in computer memory data related to such analysis for reservoir analysis and planning.

Figure 10A:
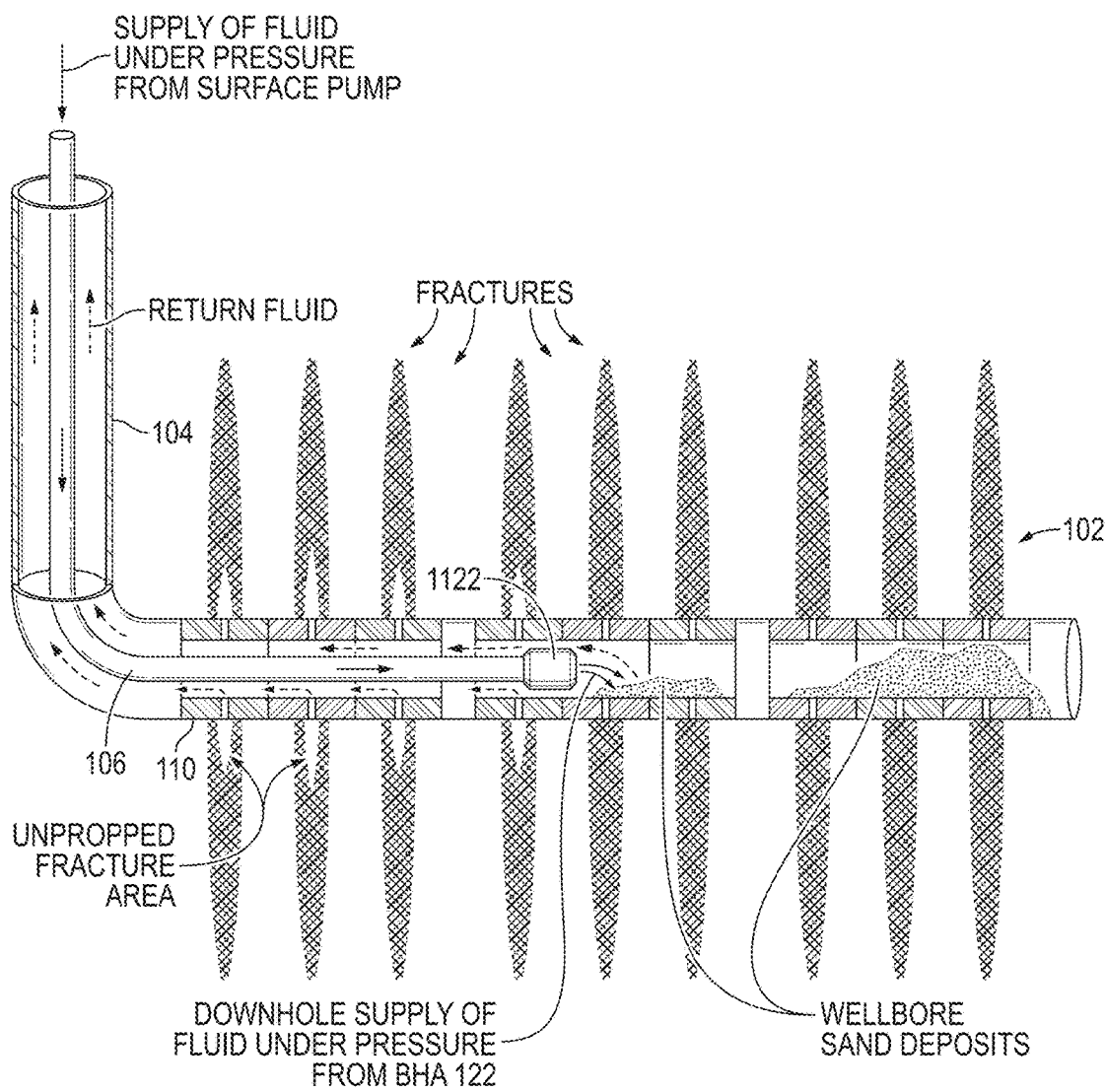

FIG. 10A is a schematic illustration of a well that traverses a hydraulically-fractured hydrocarbon-bearing reservoir. The well includes a horizontal section with production tubing that includes a number of fracturing sleeves that are offset from one another along the length of the horizontal section of the well. A BHA can be run in the well for performing clean out operations (and possibly other operations) on the well.

FIG. 10B is an exploded view of the BHA of FIG. 10A for performing clean out operations (and possibly other operations) on the well.

FIG. 11 is a flowchart illustrating operations carried out by the data analyzer of FIG. 2 that measures the inflow of produce solids corresponding to the location of the BHA and characterizes solids production associated with one or more sliding sleeves of the well.

Figure 12A:
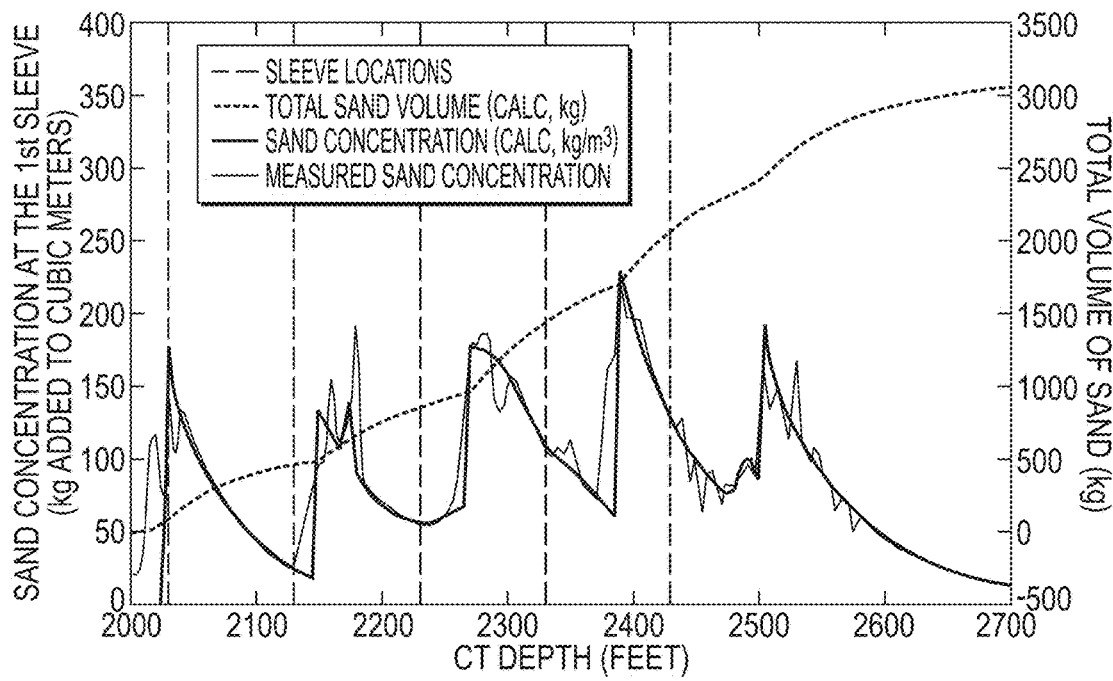
Figure 12B:
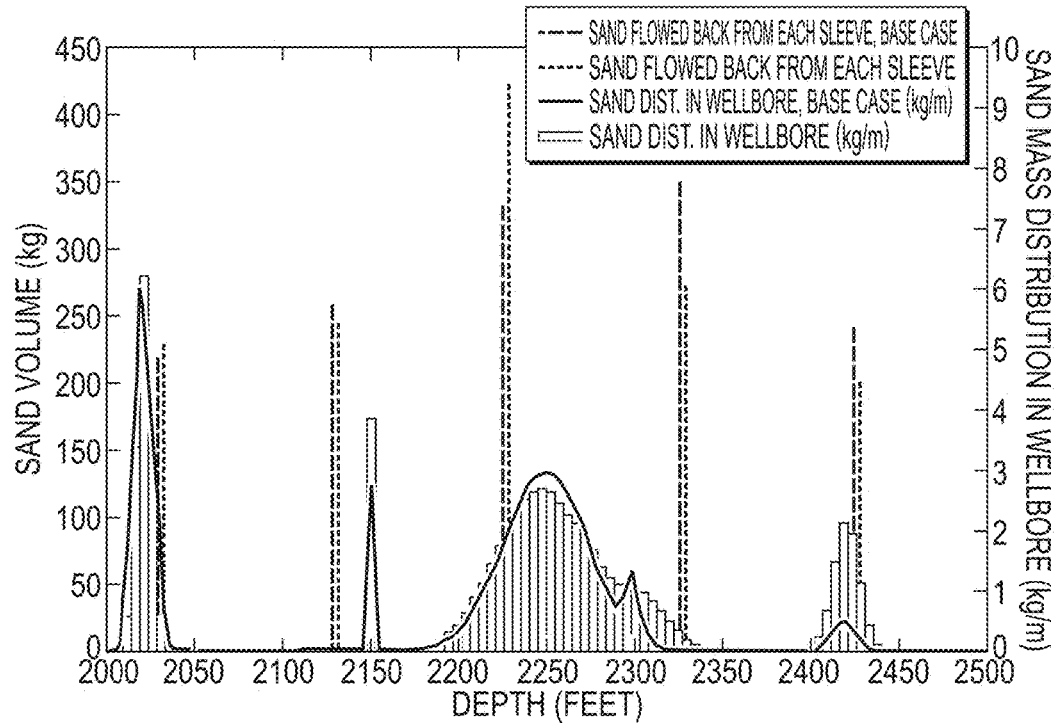

FIGS. 12A and 12B are plots that illustrate the data processing operations of the data analyzer during an exemplary slightly underbalanced clean out operation according to the workflow of FIG. 11.

DETAILED DESCRIPTION

Certain examples are shown in the above-identified figures and described in detail below. In describing these examples, like or identical reference numbers are used to identify common or similar elements. The figures are not necessarily to scale and certain features and certain views of the figures may be shown exaggerated in scale or in schematic for clarity and/or conciseness.

"Above", "upper", "upstream", "heel" and like terms in reference to a well, wellbore, tool, or formation refer to the relative direction or location near or going toward or on the surface side of the device, item, flow or other reference point, whereas "below", "lower", "downstream", "toe" and like terms refer to the relative direction or location near or going toward or on the bottom hole side of the device, item, flow or other reference point, regardless of the actual physical orientation of the well or wellbore, e.g., in vertical, horizontal, downwardly and/or upwardly sloped sections thereof.

As used herein, an open interval or open well interval refers to a section of a well with at least one perforation, perforation cluster, a jetted hole in the casing, a slot, at least one sliding sleeve or wellbore casing valve, or any other opening in the production tubing that provides communication between the formation and the wellbore.

As used herein, a fracture shall be understood as one or more cracks or surfaces of breakage within rock. Fractures can enhance permeability of rocks greatly by connecting pores together, and for that reason, fractures are induced hydraulically in some reservoirs in order to boost hydrocarbon flow. Fractures may also be referred to as natural fractures to distinguish them from fractures induced as part of a reservoir stimulation.

The term "fracturing" refers to the process and methods of breaking down a geological formation and creating a fracture, i.e. the rock formation around a well bore, by pumping fluid at very high pressures (pressure above the determined closure pressure of the formation), in order to increase production rates from a hydrocarbon reservoir. The fracturing applications described herein otherwise use conventional techniques known in the art.

FIG. 1A shows an example well 100 that has undergone hydraulic fracturing applications. In this well, a platform and derrick 116 is positioned over a wellbore 112 that may be formed in the hydrocarbon-bearing reservoir 102 by rotary drilling. While certain elements of the well 100 are illustrated in FIGS. 1A and 1B, other elements of the well (e.g., blow-out preventers, wellhead, wellhead "tree", etc.) have been omitted for clarity of illustration. The well 100 also includes vertical casing 104 cemented to the wellbore 112, a transition 108, and production tubing 107 that extends along the horizontal section of the well 100 and is cemented to the wellbore 112. The production tubing 107 includes a number of fracturing sleeves 110 that are offset from one another along the horizontal section. The production tubing 107 can include horizontal casing and/or production liner sections disposed between the fracturing sleeves 110 and cemented to wellbore 112. The vertical casing 104 terminates at a casing head (not shown) at or near the platform and derrick 116 and the surface facility (FIG. 2) at the surface 101. The fracturing sleeves 110 have radial openings or ports 120 that can be configured in an open configuration or a closed configuration. The open configuration of a respective port 120 allows fluid communication between the hydraulically fractured hydrocarbon-bearing reservoir or formation 102 and the interior space of the fracturing sleeve 110. The closed configuration of a respective port 120 occludes or blocks fluid communication between the hydraulically-fractured hydrocarbon-bearing formation 102 and the interior space of the fracturing sleeve 110. The fracturing sleeves 110 can be located as part of predetermined well intervals that correspond to desired production zones of the hydrocarbon-bearing formation 102. The number of fracturing sleeves 110 for the respective well intervals can be the same or vary over the respective well intervals. For example, a first well interval having one or more fracturing sleeves can traverse one production zone of the hydrocarbon-bearing formation 102 while a second well interval having one or more fracturing sleeves can traverse another production zone of the hydrocarbon-bearing formation 102. The number of fracturing sleeves for the first and second well intervals can be the same or be different from one another.

A bottom hole assembly ("BHA") 122 may be run inside the casing 104 and production tubing 107 (including the fracturing sleeves 110) by tubing 106 (which can be coiled tubing or drill pipe). The means for conveying the tubing 106 and the BHA 122 inside the casing 104 and the production tubing can be provided at the surface 101 or by a downhole mechanism (such as a downhole tractor) as is well known. The BHA 122 is a shifting tool that can conveyed within the production tubing 107 and configured to engage any one of the fracturing sleeves 110. In the engaged configuration, the shifting tool can be operated to configure the ports of the engaged fracturing sleeve in the open configuration or closed configuration as needed.

FIGS. 1B-1E illustrate an embodiment of one fracturing sleeve 110. Turning to FIG. 1B, the fracturing sleeve 110 has a substantially elongate cylindrical outer casing 151 extending between first and second ends 153 and 155, respectively and having a central passage 157 therethrough. The first and second ends 153, 155 of the outer casing 151 have threaded interfaces for connection to an adjacent casing/liner section or to the outer casing 151 of another fracturing sleeve 100. The fracturing sleeve 100 further includes a central portion 159 having a plurality of raised sections 161 (for example, three raised sections) extending parallel to the central axis 163 of the outer casing 161 along the lengthwise extent of the central portion 150. The raised sections 161 are spaced radially from one another about the outer circumference of the central portion 150 with elongate channels 165 disposed therebetween. Each raised section 161 supports a port body 167 having an aperture 169 extending therethrough. The aperture 169 extends from the exterior to the interior central passage 157 of the fracturing sleeve 100. Additionally, the port body 167 is radially extendable from central portion 161 so as to center the fracturing sleeve 110 within the wellbore 112 and engage the wellbore 112. The port bodies 167 and apertures 169 of the fracturing sleeve 110 correspond to the ports 120 of the fracturing sleeve 110 of FIG. 1.

Figure 1C:
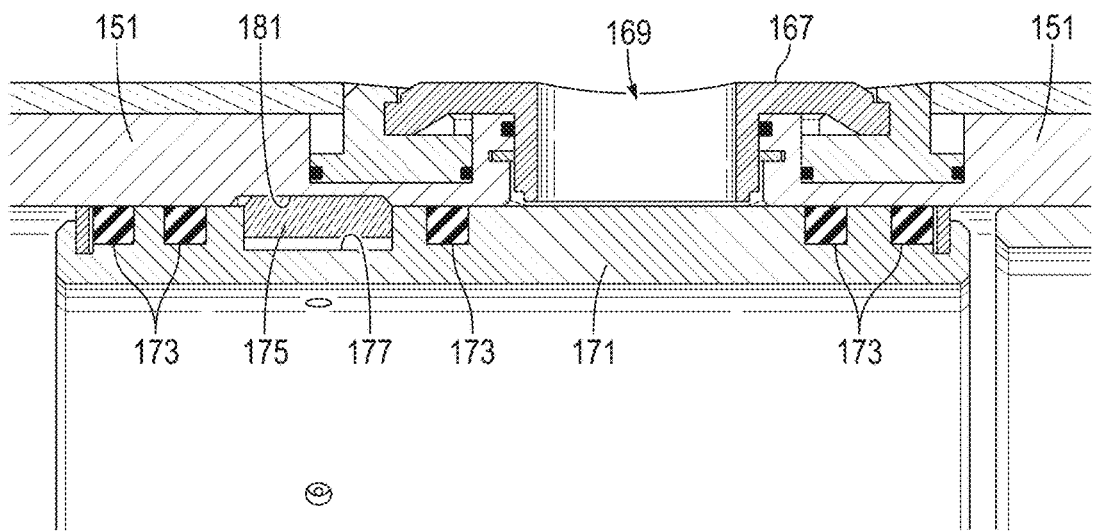
FIG. 1C is a cross-sectional view of a port of the fracturing sleeve of FIG. 1B in a closed configuration.
Figure 1D:
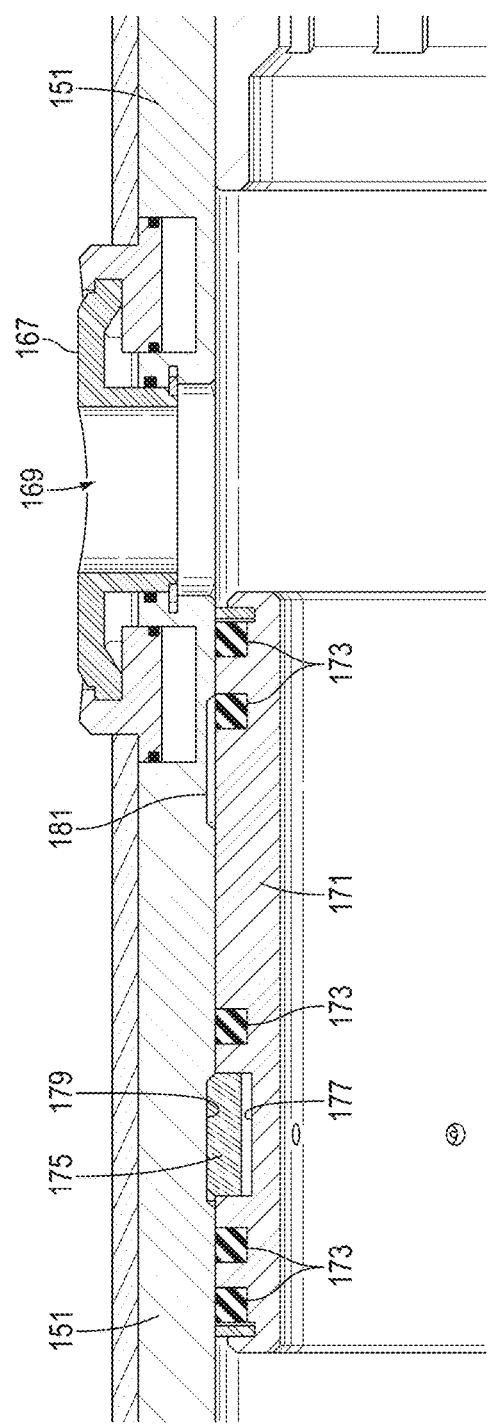
FIG. 1D is a cross-sectional view of a port of the fracturing sleeve of FIG. 1B in an open configuration.

Turning now to FIGS. 1C and 1D, a sliding sleeve 171 is supported within the central passage 157 of the outer casing 151 at an axial location corresponding to port bodies 167. The sliding sleeve 171 can slide axially within the central passage 157 between two positions: a closed position as shown in FIG. 1C and an open position as shown in FIG. 1D. In the closed position, the sliding sleeve 171 sealably covers the apertures 169 of the port bodies 167 so as to hydraulically isolate the interior central passage 157 from the exterior of the fracturing sleeve 110. In the open position, the sliding sleeve 171 leaves open the apertures 169 of the port bodies 167 so as to provide a fluid passageway between the interior central passage 157 and the exterior of the fracturing sleeve 110. The sliding sleeve 171 can include annular seals 173 that maintain a fluid tight seal between the sliding sleeve 171 and the interior of the outer casing 151 in the closed configuration where the sliding sleeve sealably covers the apertures 169 of the port bodies 167. A snap ring 175 can be disposed in an annular groove 177 disposed on the outer surface of the sliding sleeve 171 and facing the inner surface of the outer casing 151. The snap ring 175 engages a first annular groove 179 formed in the inner surface of the outer casing 151 in the open position and engages a second annular groove 181 formed in the inner surface of the outer casing 151 in the closed position. The second annular groove 81 is offset from the first annular groove 179 in a position closer to the apertures 169.

Figure 1E:
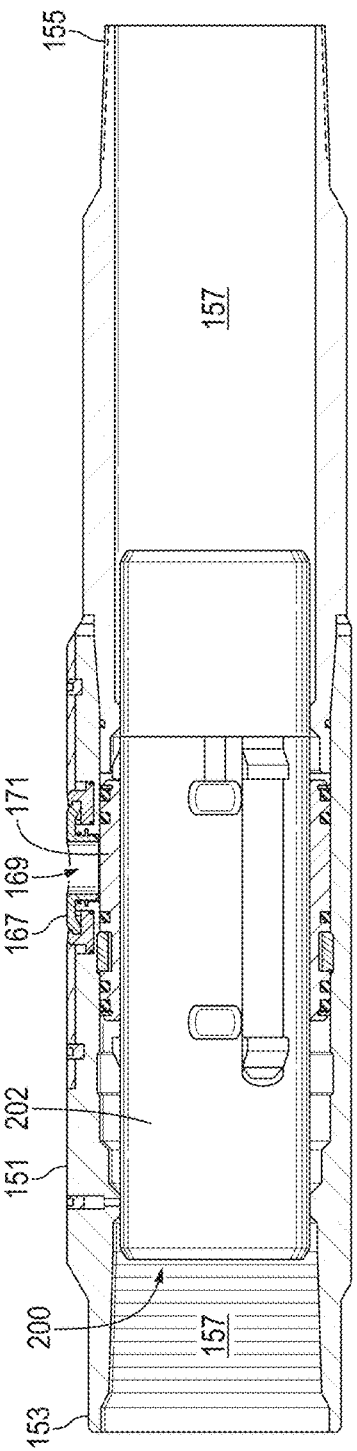

Turning now to FIG. 1D, a shifting tool 200 is illustrated within the central passage 157 of the outer casing 151 of the fracturing sleeve 110. The shifting tool 200 is adapted to engage the sliding sleeve 171 and shift it between the closed position as illustrated in FIGS. 1D and 1E and the open position illustrated in FIG. 1C. The shifting tool 200 comprises a substantially cylindrical elongate tubular body 202 that defines a central bore therethrough to receive an actuator or to permit the passage of fluids and other tools therethrough. The shifting tool 200 includes at least one sleeve engaging member radially extendable from the tubular body 202 so as to be selectably engageable with the sliding sleeve 171 and shift the position of the sliding sleeve 171. In operation, a fluid pressure applied to the central bore of the shifting tool can extend the sleeve engaging member(s) for engagement with the sliding sleeve 171. With the sleeve engaging member(s) engaged with the sliding sleeve 171, axial movement of the shifting tool 200 can move the sliding sleeve 171 from the open to closed position or vice versa. The uphole end of the tubular body 202 of the shifting tool 200 can include threaded interface for connection to the tubing 106 or other upstream tools. The downhole end of the tubular body 202 of the shifting tool 200 can include threaded interface for connection to other downstream tools.

Additional details of the fracturing sleeve 100 and shifting tool 200 of FIGS. 1B-1E are described in U.S. Patent Publ. No. US2012/0125627 to Grant, commonly assigned to assignee of the present application and herein incorporated by reference in its entirety.

As shown in FIG. 2, the surface facility 200 includes a well-head choke 201, a multiphase flow meter 203, fluid separation and storage stage 205, and a data analyzer 207. One or more optional downhole pressure sensor(s) 209 may also be included. The downhole pressure sensor(s) 209 can be integral to the shifting tool BHA 122, the tubing 106 that is used to run in the shifting tool BHA 122, the production tubing 107, the fracturing sleeves 110, or some other part of the well completion. Produced fluid 130 can flow from the production tubing 107 of the horizontal section uphole through the annulus between the tubing 106 and the vertical casing 104 (or possibly through a return flowpath provided by the tubing 106 itself). At the surface, the produced fluid 130 flows from the platform 116 through the multiphase flow meter 203 for separation into various phases (solids, oil, gas, water) and storage by the fluid separation and storage stage 205. The multiphase flow meter 203 can be configured to measure the flow rates of different phases (e.g., oil, gas, water, solids) that make up the produced fluid 130 that returns to the surface. The oil and gas phases of the produced fluid 103 can originate from hydrocarbons that flow from the hydraulically-fractured formation 102 through open ports 120 of the fracturing sleeves 110 and back to the surface as part of the produced fluid 130. The water phase of the produced fluid 103 can originate from water-based fracturing fluid or connate water that flows from the hydraulically-fractured formation 102 through open ports 120 of the fracturing sleeves 110 back to the surface as part of the produced fluid 130. The solid phase of the produced fluid 130 can originate from proppant (e.g., sand) or possibly rock fragments flows from the hydraulically-fractured formation 102 through open ports 120 of the fracturing sleeves 110 (or that has settled in the production tubing itself and flows) back to the surface as part of the produced fluid 130. The produced fluid 130 can be generated as part of a flowback process that follows the hydraulic fracturing treatment of the well using the fracturing sleeves 110 in preparation for cleanup and starting production from the well. Alternatively, the produced fluid 130 can be generated as part of a workover process in preparation for returning the well to production.

The data analyzer 207 interfaces to the multiphase flow meter 203 and possibly the downhole pressure sensor(s) 209 via suitable data communication links (such as wired electrical communication links, wireless RF communication links, or optical communication links). The surface-located multiphase flow meter 203 can be configured to measure flow rates of the various phases (oil/gas/water/solid) of the stream of produced fluid 130 produced from the well in real time. In one embodiment, the multiphase flow meter 203 may be a Model Vx Spectra multiphase flow meter supplied by Schlumberger Limited of Sugarland, Tex. The data analyzer 207 can be configured to process the multiphase flow rate measurements of the produced fluid 130 carried out by the surface-located multiphase flow meter 203 and pressure measurements carried out by the downhole pressure sensor(s) 209 after opening (or closing) the ports 120 of a set of one or more fracturing sleeves 110 in order to characterize the flow contributions of one or more different fluid phases that flow through the ports 120 of the set of one or more fracturing sleeves 110 in their open configuration. Such flow contributions can characterize the flow rates of fracturing fluid and/or connate water, oil, gas and/or solids (e.g., proppants) that flows through the ports 120 of the set of one or more fracturing sleeves 110 in their open configuration. The data analyzer 207 can determine such flow contributions using nodal analysis and modeling of the multiphase flow rate measurements of the produced fluid 130 carried out by the multiphase flow meter 203 and optional downhole pressure measurements carried out by the downhole pressure sensor(s) 209. The flow contributions of one or more different fluid phases that flow through the ports 120 of the set of one or more fracturing sleeves 110 in their open configuration can be used to characterize local properties of the formation 102 adjacent the set of one or more fracturing sleeves 110 for reservoir analysis and/or planning. For example, such local formation properties can include fracture area and/or fracture conductivity, or sand production rate of the formation adjacent the set of one or more fracturing sleeves 110. This process can be repeated in conjunction with opening (or closing) additional sets of one or more fracturing sleeves in order to characterize local formation properties adjacent the additional sets of one or more fracturing sleeves along the length of the well.

The characterization of each interval can allow the determination of the number of intervals contributing to production as well as the magnitude of their respective contribution, which is a key information for further optimization. It can be used to optimize the subsequent flowback program, generate safe pressure/flowrate windows for early production (e.g. without excessive proppant flowback or early near wellbore fracture closure), as this operation requires the knowledge of the producing rate per fracture. Stages associated with significant solids production but limited hydrocarbon flow can also be closed off. Such information can also provide a measure of the variability of fracture production along the well so that it can be mitigated by changing the design of subsequent wells. Subsequent to the sleeve opening and flowback period, the characterization of the intervals can provide a first estimate of the well productivity and will serve as the basis for evaluating the need for artificial lift and its design. In the extreme case of very poor stimulation, the need for immediate re-stimulation or remedial stimulation may be flagged by an unfavorable characterization of the intervals. One of the major issues is determining potential re-fracturing candidate zones. If one stage is found not to be producing and yet we determine that it is well connected to an adjacent productive zone, then we can possibly assume that the reservoir behind the casing is actually producing, and may not necessarily be a good re-fracturing candidate. If we should that an interval is not producing, and is not well connected to neighboring stages, then it may be a very good re-fracturing target. Furthermore, if stages are found to be placed in parts of the reservoirs that are depleted, e.g. if the analysis shows that cross-flow exists between stages, those stages taking fluid from the other producing stages can be closed off.

FIG. 3 shows an example computing system 300 that can be used to implement the data analyzer 207 or parts thereof. The computing system 300 can be an individual computer system 301A or an arrangement of distributed computer systems. The computer system 301A includes one or more analysis modules 303 (a program of computer-executable instructions and associated data) that can be configured to perform various tasks according to some embodiments, such as the tasks described herein. To perform these various tasks, an analysis module 303 executes on one or more processors 305, which is (or are) connected to one or more storage media 307. The processor(s) 305 is (or are) also connected to a network interface 309 to allow the computer system 301A to communicate over a data network 311 with one or more additional computer systems and/or computing systems, such as 301B, 301C, and/or 301D. Note that computer systems 301B, 301C and/or 301D may or may not share the same architecture as computer system 301A, and may be located in different physical locations.

The processor 305 can include at least a microprocessor, microcontroller, processor module or subsystem, programmable integrated circuit, programmable gate array, digital signal processor (DSP), or another control or computing device.

The storage media 307 can be implemented as one or more non-transitory computer-readable or machine-readable storage media. Note that while in the embodiment of FIG. 3, the storage media 307 is depicted as within computer system 301A, in some embodiments, storage media 307 may be distributed within and/or across multiple internal and/or external enclosures of computing system 301A and/or additional computing systems. Storage media 307 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the computer-executable instructions and associated data of the analysis module(s) 303 can be provided on one computer-readable or machine-readable storage medium of the storage media 307, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

It should be appreciated that computing system 300 is only one example of a computing system, and that computing system 300 may have more or fewer components than shown, may combine additional components not depicted in the embodiment of FIG. 3, and/or computing system 300 may have a different configuration or arrangement of the components depicted in FIG. 3. The various components shown in FIG. 3 may be implemented in hardware, software, or a combination of both hardware and software, including one or more signal processing and/or application specific integrated circuits.

Further, the operations of the data analyzer 207 as described herein may be implemented by running one or more functional modules in an information processing apparatus such as general purpose processors or application specific chips, such as ASICs, FPGAs, PLDs, SOCs, or other appropriate devices. These modules, combinations of these modules, and/or their combination with general hardware are all included within the scope of the disclosure.

FIG. 4A illustrates a workflow that opens a set of one or more fracturing sleeves and analyzes produced fluid that flows from the well to the surface facility of FIG. 2 after opening the set of one or more fracturing sleeves in order to characterize local properties of the formation adjacent the set of one or more fracturing sleeves 110. The ports 120 for all of the fracturing sleeves 110 of the well can be initially configured in their closed configuration, which effects bottomhole shut-in of the well. The workflow begins in block 401 where the shifting tool BHA 122 is positioned and operated such that it opens the port(s) 120 of a set of one or more fracturing sleeves 110. Such operations permit the flow of produced fluid 130 from the fractures and formation adjacent the set of one or more fracturing sleeves 110 and through the open port(s) 120 of the set of one or more fracturing sleeves 110 to the surface facility 200 (FIG. 2).

In block 403, the data analyzer 207 is used to process the surface flow rate measurements output by the multiphase flow meter 203 and the downhole pressure measurements output by the downhole pressure sensor(s) 209 in order to analyze the produced fluid 130 and characterize one or more local formation properties of the formation adjacent the set of one or more fracturing sleeves 110 (whose ports 120 were opened in block 401).

In block 405, the data analyzers 207 stores in computer memory data representing the local formation properties of the formation adjacent the set of one or more fracturing sleeves 110 as determined in block 403 for reservoir analysis and planning.

In block 407, it is determined whether one or more local formation properties indicate depleted formation or well damage/fracture collapse or other condition(s) that can be remedied by closing the ports of the set of one or more fracturing sleeves. The determination of block 407 can be performed in an automated manner by computer evaluation of one or more predefined conditions, in a manual manner by human analysis of the data or in a semi-automated manner involving both computer evaluation and human analysis. If so, the workflow continues to block 409 where the shifting tool is operated such that it closes the port(s) 120 of the set of one or more fracturing sleeves 110. In other embodiments, the port(s) 120 of the set of one or more fracturing sleeves 110 can remain closed if closed. This operation blocks flow of produced fluid from the fractures and formation adjacent the set of one or more fracturing sleeves 110 into the well, and the operations continue to block 411. Otherwise (it is determined that one or more local formation properties do not indicate depleted formation or well damage/fracture collapse or other condition(s) that can be remedied by closing the ports of the set of one or more fracturing sleeves), the set of one or more fracturing sleeves of the well can remain open and the workflow continues to block 411. In other embodiments, the port(s) 120 of the set of one or more fracturing sleeves 110 can be opened if initially closed.

In block 411, it is determined whether to repeat the operations of blocks 401 to 409 for an additional set of one or more fracturing sleeves. The determination of block 411 can be performed in an automated manner by computer evaluation of one or more predefined conditions, in a manual manner by human analysis of the data or in a semi-automated manner involving both computer evaluation and human analysis. If so, the workflow reverts back to block 401 in order to repeat the operations of blocks 401 to 409. Otherwise, the workflow continues to block 413 where the shifting tool BHA 122 is removed from the well and the workflow ends.

Note that the sequence of fracturing sleeves whose ports are opened by the workflow can be varied as desired. For example, the ports of individual fracturing sleeves can be opened from the heel to the toe of the well (or from the toe to the heel of the well) in order to analyze the produced fluid and characterize one or more local formation properties of the formation adjacent each individual fracturing sleeve of the formation and remedy certain condition(s) that are detected for specific well intervals by closing the ports of the fracturing sleeves for the specific well intervals. In another embodiment, the ports of other combinations or sets of fracturing sleeves can be opened in sequence in order to analyze the produced fluid and characterize one or more local formation properties of the formation adjacent the combinations or sets of fracturing sleeves and remedy certain condition(s) that are detected for specific well intervals by closing the ports of the fracturing sleeves for the specific well intervals.

Also note that workflow can be adapted such that the ports of combinations or sets of fracturing sleeves are closed from an initial open configuration in order to analyze the produced fluid and characterize one or more local formation properties of the formation adjacent the combinations or sets of fracturing sleeves and remedy certain condition(s) that are detected for specific well intervals by closing the ports of the fracturing sleeves for the specific well intervals.

In one embodiment shown in FIG. 4B, the analysis begins in block 451 by using the shifting tool BHA to open a fracturing sleeve of the well. In block 453, flowing well status is established with the BHA located across the open fracturing sleeve. In block 455, once flow is established, the data analyzer 207 can be used to process the surface flow rate measurements output by the multiphase flow meter 203 and the downhole pressure measurements output by the downhole pressure sensor(s) 209 in order to analyze the produced fluid 130 and characterize the outflow of return fluid to the surface over time. In block 457, the return fluid measurements of block 455 can be used to calculate and model the downhole contributions from all open intervals. Note that the model of block 457 is a combination or convolution of the return outflow from all open intervals (including the newly-opened interval) of the well, and these open intervals are different over the sequence of well intervals whose fracturing sleeves are opened by the operations. In block 459, the data analyzer 207 calculates the return outflow of the newly-opened interval by isolating the contribution of return outflow for the newly-opened interval from the previous model (derived from the last iteration of block 457). The calculations of block 459 can involve subtracting the return outflow from the previous model (derived from the last iteration of block 457) from the return outflow of the model derived in block 457. Furthermore, in block 459, the data analyzer 207 derives local formation properties of the newly-opened interval based on the return outflow for the newly-opened interval, for example, by correlation, modeling or other suitable techniques.

Note that the operations of blocks 451 to 459 can be performed iteratively over a sequence of fracturing sleeves of the well in order to derive local formation properties for each newly-opened interval. As each given fracturing sleeve of the sequence is opened, the new measurements of surface flow characteristics and downhole pressure measurements are used to update the calculations and model of block 457. Changes to the model between before and after opening the given fracturing sleeve can be used to isolate the contribution of return outflow for the newly-opened interval and derive local formation properties based thereon in block 459. The well intervals that correspond to the sequence of fracturing sleeves that are opened by the operations of FIG. 4B can be varied as desired. For example, fracturing sleeves and corresponding intervals can be opened and characterized interval-by-interval from the heel to the toe of the well (or from the toe to the heel of the well).

In other embodiments, the operations of FIGS. 4A and 4B can be adapted to close a sequence of fracturing sleeves of the well in order to derive local formation properties for each newly-closed interval. In this case, as each given fracturing sleeve of the sequence is closed, the new measurements of surface flow characteristics and downhole pressure measurements are used to update the calculations and model. Changes to the model between before and after closing the given fracturing sleeve can be used to isolate the contribution of return outflow for the newly-closed interval and derive local formation properties based thereon. The well intervals that correspond to the sequence of fracturing sleeves that are closed by the operations of the workflow can be varied as desired. For example, fracturing sleeves and corresponding intervals can be closed and characterized interval-by-interval from the heel to the toe of the well (or from the toe to the heel of the well).

FIG. 5A shows the horizontal section 5000 of an example well that has undergone hydraulic fracturing applications. The well includes a surface-located platform and derrick and vertical casing similar to the well of FIG. 1A that are not shown for the sake of simplicity of description. The horizontal section 5000 includes production tubing 5107 that extends along the horizontal section and is cemented to the wellbore 5112. The production tubing 5107 includes a number of perforated production liners or casing 5110 that offset from one another along the horizontal section. The perforated production liners or casing 5110 have perforation zones or ports 5120 that are fixed open and allow fluid communication between the hydraulically-fractured hydrocarbon-bearing formation 5102 and the interior space of the perforated production liners or casing 5110. The perforation zones or ports 5120 can be formed by bullet gun, abrasives, water jets, shaped charge or other suitable perforating methodologies used to initiate a hole from the wellbore through the production liners or casing 5110 and any cement sheath into the hydrocarbon-bearing formation 5102. The production tubing 5107 can also include non-perforated horizontal casing and/or production liner sections that are disposed between the perforated production liners or casing 5110 and cemented to wellbore 5112. The perforated production liners or casing 5110 can be located as part of predetermined well intervals that correspond to desired production zones of the hydrocarbon-bearing formation 5102. The number of perforated production liners 5110 for the respective well intervals can be the same or vary over the respective well intervals. For example, a first well interval having one or more perforated production liners or casing 5110 can traverse one production zone of the hydrocarbon-bearing formation 5102 while a second well interval having one or more perforated production liners or casing 5110 can traverse another production zone of the hydrocarbon-bearing formation 5102. The number of perforated production liners or casing 5110 for the first and second well intervals can be the same or be different from one another.

A bottom hole assembly ("BHA") 5122 may be run inside the production tubing 1107 of the horizontal section 5000 (including the perforated production liners or casing 5110) by tubing 5106 (which can be coiled tubing or drill pipe). The means for conveying the tubing 5106 and the BHA 5122 inside the production tubing 5107 can be provided at the surface or by a downhole mechanism (such as a downhole tractor) as is well known. The BHA 5122 is a resettable packer that can be conveyed within the production tubing 5107 to a desired location and set to engage and form a sealed interface to the production tubing 5107. The sealed interface provided by the packer 5122 isolates a set of one or more intervals of the horizontal section 5000 that are upstream from the packer 5122 from one or more intervals of the horizontal section 5000 that are downstream from the packer 5122. In this set configuration, the set of one or more intervals that are upstream from the packer 5122 are in fluid communication with the surface facility, while the one or more intervals downstream from the packer 5122 are fluidly isolated and decoupled from the surface facility (FIG. 2). The packer 5122 can also be configured such that the sealed interface between the packer 5122 and the production tubing 5107 can be released, which allows the resettable packer 5122 to be conveyed to another desired location and set to engage and form another sealed interface to the production tubing 5107 at the new location.

FIGS. 5B-5D illustrate an embodiment of a resettable packer 5122. Turning to FIG. 5B, the packer 5122 has a first end 5151 disposed opposite a second end 5153, and is formed around a central tubular member or mandrel 5155. The central mandrel 5155 includes the second end 5153 which can be connected to conveyance tubing or other downstream tools using known mechanisms such as threading and the like. As illustrated, the packer 5122 includes an assembly of collet arms 5157 disposed near the second end 5153, a release section 5159 disposed near the first end 5151, at least one expandable seal element 5161 disposed near the release section 5159, and slip 5163 disposed between the seal element(s) 5161 and the collet arms 5157.

The collet arms 5157 extend longitudinally along the exterior surface of the packer 5122. Each collet arm 5157 includes a radially extended contact surface 1165 that is flared radially from the packer 5122 as best shown in FIG. 5C so as to cause the contact surface 5165 to engage upon production tubing (e.g., the production liner or casing) of the well and cause drag therewith.

The slip 5163 includes a plurality of pivot arms 5167 that extend along the exterior surface of the packer 5122 in a direction generally towards the first end 5151. The pivot arms 5167 are supported by a moveable housing 1169 that can slide longitudinally relative to the central mandrel 5155. The pivot arms 5167 pivot between a retracted configuration (where the arms 5167 extend in a direction substantially parallel to the central axis of the mandrel 5155) and an extended configuration (where the arms 5167 extend at angle away from the central axis of the mandrel 5155) by sliding movement of the moveable housing 5169 toward a cone 5171. The cone 5171 is a frusto-conical tubular body that is located around the central mandrel 5155 as best shown in FIG. 5D. The cone 5171 includes an angled surface that interfaces to the bottom surface of the pivot arms 5167 and pivots the arms 5167 into their extended configuration by the sliding movement of the moveable housing 5169 toward the cone 5171. In the extended configuration, the arms 5167 can engage the production tubing (e.g., liner or casing) of the well in order to fix the packer 5122 at a desired location in the well.

Tool pressure can be applied to the central mandrel 5155 toward the second end 1153, which can compress the one or more seal elements 5161 such that the seal element(s) 5161 deform and expand radially to provide a seal interface between the production tubing 5107 (such as liner or casing) of the well and the packer 5122. This seal interface can be used for well interval isolation purposes as described herein. As illustrated in FIGS. 5B and 5C, the packer may include three seal elements 5161; however, it will be appreciated that more or less than three may also be utilized.

The release section 5159 of the packer 5122 includes a top collar 5173 forming the first end 5151. The top collar 5173 can be connected to the conveyance tubing 5106 using known mechanisms such as threading and the like. The release section 5159 further includes a bypass mandrel 5175 secured to the top collar 5173 with first and second bypass plugs, respectively. The first and second bypass plugs can be adapted to sequentially permit an increasing amount of material past the packer. In order to release the packer 5122, the top collar 5173 is retracted in a direction generally indicated at 5177, which pulls the top collar 5173 and the bypass mandrel 5175 with it drawing the first bypass plug so as to disengage it from the second bypass plug thereby permitting flow of material through the packer 5122. Further retracting movement of the top collar 5173 and bypass mandrel 5175 will also draw the second bypass plug so as to disengage it from the central mandrel 5155 thereby permitting full flow of material through the packer 5122. The retracting movement of the top collar 5173 and the bypass mandrel 5175 can also cause retraction movement of the central mandrel 5155, which will cause the cone 5171 to be pulled away from the arms 5167 thereby permitting the arms 5167 to disengage from the surrounding production tubing as well as decompressing the seal element(s) 5161 so as to release the seal interface between the production tubing 5107 (such as liner or casing) of the well and the packer 5122. Thereafter the entire packer 5122 may be removed or repositioned as desired. If the packer 5122 is desired to be repositioned, it may be positioned at the desired location and reset to define a seal interface between the production tubing 5107 (such as liner or casing) of the well and the packer 5122 at the new location in the well as described above.

The surface facility 200 of FIG. 2 can be configured to analyze produced fluid that flows from the horizontal section 5000 with the resettable packer 5122 set at position in the horizontal section 5000. In this set configuration, the set of one or more intervals that are upstream from the packer 5122 are in fluid communication with the surface facility 200, while the one or more intervals downstream from the packer 5122 are fluidly isolated and decoupled from the surface facility 200. One or more optional downhole pressure sensor(s) 209 may also be included. The downhole pressure sensor(s) 209 can be integral to the packer 5122, the tubing 5106 that is used to run in the packer 5122, the production tubing 5107, or some other part of the well completion. Produced fluid 130 can flow from the production tubing 5107 of the horizontal section uphole through the annulus between the conveyance tubing 5106 and the vertical casing (or possibly through a return flowpath provided by the conveyance tubing 5106). At the surface, the produced fluid 130 flows from the platform 116 through the multiphase flow meter 203 for separation into various phases (solids, oil, gas, water) and storage by the fluid separation and storage stage 205. The multiphase flow meter 203 can be configured to measure the flow rates of different phases (e.g., oil, gas, water, solids) that make up the produced fluid 130 that returns to the surface. The oil and gas phases of the produced fluid 103 can originate from hydrocarbons that flow from the hydraulically-fractured formation 5102 through the perforation zones 5120 of the perforated liner(s) or casing 5110 that are part of the set of isolated well interval(s) located upstream of the packer 5122. The water phase of the produced fluid 130 can originate from water-based fracturing fluid or connate water that flows from the hydraulically-fractured formation 5102 through the perforation zones 5120 of the perforated liner(s) or casing 5110 that are part of the set of isolated well interval(s) located upstream of the packer 5122. The solid phase of the produced fluid 130 can originate from proppant (e.g., sand) or possibly rock fragments that flow from the hydraulically-fractured formation 5102 through the perforation zones 5120 of the perforated liner(s) or casing 5110 that are part of the set of isolated well interval(s) located upstream of the packer 5122. The produced fluid 130 can be generated as part of a flowback process that follows the hydraulic fracturing treatment of the well in preparation for cleanup and starting production from the well. Alternatively, the produced fluid 130 can be generated as part of a workover process in preparation for returning the well to production.

The data analyzer 207 interfaces to the multiphase flow meter 203 and possibly the downhole pressure sensor(s) 209 via suitable data communication links (such as wired electrical communication links, wireless RF communication links, or optical communication links). The surface-located multiphase flow meter 203 can be configured to measure flow rates of the various phases (oil/gas/water/solid) of the stream of produced fluid 130 produced from the well in real time. In one embodiment, the multiphase flow meter 203 may be a Model Vx Spectra multiphase flow meter supplied by Schlumberger Limited of Sugarland, Tex. The data analyzer 207 can be configured to process the multiphase flow rate measurements of the produced fluid 130 carried out by the surface-located multiphase flow meter 203 and the downhole pressure measurements carried out by the downhole pressure sensor(s) 209 after setting the packer 5122 to isolate a set of isolated well interval(s) located upstream of the packer 5122 in order to characterize the flow contributions of one or more different fluid phases that flow through the perforation zones 5120 of the perforated liner(s) or casing 5110 that are part of the set of isolated well interval(s) located upstream of the packer 5122. Such flow contributions can characterize the flow rates of fracturing fluid and/or connate water, oil, gas and/or solids (e.g., proppants) that flows through the perforation zones 5120 of the perforated liner(s) or casing 5110 that are part of the set of isolated well interval(s) located upstream of the packer 5122. The data analyzer 207 can determine such flow contributions using nodal analysis and modeling of the multiphase flow rate measurements of the produced fluid 130 carried out by the multiphase flow meter 203 and the downhole pressure measurements carried out by the downhole pressure sensor(s) 209. The flow contributions of one or more different fluid phases that flow through the perforation zones 5120 of the perforated liner(s) or casing 5110 that are part of the set of isolated well interval(s) located upstream of the packer 5122 can be used to characterize local properties of the formation 102 adjacent the set of isolated well interval(s) located upstream of the packer 5122. For example, such local formation properties can include fracture area and/or fracture conductivity of the formation adjacent the set of isolated well interval(s) located upstream of the packer 5122. This process can be repeated in conjunction with isolating additional sets of well intervals located upstream of the packer 5122 in order to characterize local formation properties adjacent these additional sets of well intervals along the length of the well.

The characterization of each interval can allow the determination of the number of intervals contributing to production as well as the magnitude of their respective contribution. In turn, such information can be used to optimize the subsequent flowback program, generate safe pressure/flow-rate windows for early production (e.g., without excessive proppant flowback or early near wellbore fracture closure). Such information can also provide a measure of the variability of fracture production along the well so that it can be mitigated by changing the design of subsequent wells. Subsequent to the sleeve opening and flowback period, the characterization of the intervals can provide a first estimate of the well productivity and can serve as the basis for evaluating the need for artificial lift and its design. In the extreme case of very poor stimulation, the need for immediate re-stimulation or remedial stimulation may be flagged by an unfavorable characterization of the intervals. One of the major issues is determining potential re-fracturing candidate zones. If one stage is found not to be producing and yet we determine that it is well connected to an adjacent productive zone, then we can possibly assume that the reservoir behind the casing is actually producing, and may not necessarily be a good re-fracturing candidate. If we should that an interval is not producing, and is not well connected to neighboring stages, then it may be a very good re-fracturing target.

FIG. 6A illustrates a workflow that sets the resettable packer 5122 at a position in the horizontal section 5000 of FIG. 5A. In this set configuration, the set of one or more intervals that are upstream from the packer 5122 are in fluid communication with the surface facility 200, while the one or more intervals downstream from the packer 5122 are fluidly isolated and decoupled from the surface facility 200. After setting the packer, the produced fluid 130 that flows from the well to the surface facility of FIG. 2 is analyzed in order to characterize local properties of the formation adjacent the set of one or more well intervals that are positioned upstream of the resettable packer 5122. The workflow begins in block 601, where the resettable packer 5122 is located at a desired position in the horizontal section 5000 that is suitable for isolating a set of one or more well intervals in fluid communication with the surface facility 200.

In block 603, the resettable packer 5122 is set at the desired position of block 601. In this set configuration, the set of one or more intervals that are upstream from the packer 5122 are in fluid communication with the surface facility 200, while the one or more intervals downstream from the packer 5122 are fluidly isolated and decoupled from the surface facility 200. This permits flow of produced fluid 130 from the fractures and formation 5102 adjacent the set of one of more well intervals that are upstream from the packer 5122 to the surface facility 200.

In block 605, the data analyzer 207 is used to process the surface flow rate measurements output by the multiphase flow meter 203 and possibly the downhole pressure measurements output by the downhole pressure sensor(s) 209 over time in order to analyze the produced fluid 130 and characterize one or more local formation properties of the formation 5102 adjacent the set of one or more well intervals that are upstream from the packer 5122.

In block 606, the data analyzers 207 stores in computer memory data representing the local formation properties of the formation 5102 adjacent the set of one or more well intervals that are upstream from the packer 5122 as determined in block 605 for reservoir analysis and planning.

In block 607, it is determined whether one or more local formation properties indicate depleted formation or well damage/fracture collapse or other condition(s) that can be remedied by sealing one or more intervals located upstream of the packer 5122. The determination of block 607 can be performed in an automated manner by computer evaluation of one or more predefined conditions, in a manual manner by human analysis of the data or in a semi-automated manner involving both computer evaluation and human analysis. If so, the workflow continues to block 609. Otherwise, the workflow continues to block 611.

In block 609, a sealing agent can be pumped downhole such that the sealing agent blocks the flow of produced fluid from the fractures and formation 5102 into one or more intervals of the set of well intervals that are located upstream of the packer 5122, and the operations continue to block 611. The sealing agent can be pumped downhole via a fluid pathway that is part of the conveyance tubing 5106 or via some other suitable means. Other zones opened to the wellbore may be isolated prior to placement of the sealing agent. In one specific example, it can be done by using a dual packer system that enables injection of the sealing material into the zone that is planned to be sealed or by isolating other open interval by any other mean (e.g. by closing sleeves on such intervals if such sleeves are available).

The sealing agent can include a solid removable sealing agent that is placed in the perforation zones 5120 and/or in the space between the formation 5102 and the perforated liner(s) and/or casing 5110. In one or more embodiments, the solid removable sealing agent may be a dissolvable material, which may comprise acid soluble cement, calcium and/or magnesium carbonate, polyesters including esters of lactic hydroxycarbonic acids and copolymers thereof, active metals such as magnesium, aluminum, zinc, and their alloys, hydrocarbons with greater than 30 carbon atoms including, for example, paraffins and waxes, and carboxylic acids such as benzoic acid and its derivatives. Further, in one or more embodiments, the dissolvable solid removable sealing agent may be slightly soluble in a wellbore fluid at certain conditions and would have a long dissolution time in said fluid. Examples of combinations of removable sealing agents and wellbore fluids that result in slightly soluble dissolvable removable sealing agents are benzoic acid with a water-based wellbore fluid and rock salt with a brine in the wellbore fluid. The solid removable sealing agent may be in any size and form: grains, powder, spheres, balls, beads, fibers, or other forms known in the art. In order to facilitate the delivery of the solid composition to the desired zone for sealing, the solid composition may be suspended in liquids such as gelled water, viscoelastic surfactant fluids, cross-linked fluids, slick-water, foams, emulsions, brines, water, and sea-water.

The sealing agent can also be a viscous fluid that reduces the permeability of the formation rock or fracture. In one or more embodiments, the viscous fluids may comprise at least one of viscoelastic surfactant fluids, cross-linked polymer solutions, slick-water, foams, emulsions, dispersions of acid soluble particulate carbonates, dispersions of oil soluble resins, or any other viscosified fluid that may be subsequently dissolved or otherwise removed (such as by breaking of the viscosification).

The sealing agent can also include a removable sealing agent, which may be any material, such as solid materials (including, for example, degradable solids) that can be removed from their sealing location. In some embodiments, the removal may be assisted or accelerated by a wash containing an appropriate reactant (for example, capable of reacting with one or more molecules of the sealing agent to cleave a bond in one or more molecules in the sealing agent), and/or solvent (for example, capable of causing a sealing agent molecule to transition from the solid phase to being dispersed and/or dissolved in a liquid phase), such as a component that changes the pH and/or salinity within the wellbore. In some embodiments, the removal may be assisted or accelerated by a wash containing an appropriate component that changes the pH and/or salinity. The removal may also be assisted by an increase in temperature, for example, when the treatment is performed before steam flooding, and/or a change in pressure. In some embodiments, the removable sealing agents may be a degradable material. A degradable material refers to a material that will at least partially degrade (for example, by cleavage of a chemical bond) within a desired period of time such that no additional intervention is used to remove the seal. The degradation of the material may be triggered by a temperature change, and/or by chemical reaction between the material and another reactant. Degradation may include dissolution of the material.

Additional details of exemplary sealing agents are described in U.S. Patent Application Publication Nos. 2006/0113077, 2008/0093073, 2012/0181034 and 2016/0024902, the disclosures of which are incorporated by reference herein in their entireties.

In block 611, it is determined whether to repeat the operations of blocks 601 to 609 for an additional set of one or more well intervals. The determination of block 611 can be performed in an automated manner by computer evaluation of one or more predefined conditions, in a manual manner by human analysis of the data or in a semi-automated manner involving both computer evaluation and human analysis. If so, the operations continue to block 613 where the resettable packer 5122 is deactivated (in order to break the seal interface and allow the packer 5122 to move within the horizontal section 1000) and the workflow reverts back to block 601 in order to repeat the operations of blocks 601 to 609. Otherwise, the workflow continues to block 613 where the resettable packer 5122 is removed from the well and the workflow ends.

Note that the sequence of isolated well intervals can be varied as desired. For example, individual well intervals can be isolated from the heel to the toe of the well (or from the toe to the heel of the well) in order to analyze the produced fluid and characterize one or more local formation properties of the formation adjacent each individual well interval and remedy certain condition(s) that are detected for specific well intervals by sealing the specific well intervals.

In other embodiment, other combinations or sets of well intervals can be opened in sequence in order to analyze the produced fluid and characterize one or more local formation properties of the formation adjacent the combinations or sets of well intervals and remedy certain condition(s) that are detected for specific well intervals by sealing the specific well intervals.

In one embodiment shown in FIG. 6B, the analysis begins in block 651 by moving and activating the resettable packer 5122 such that it isolates one or more well intervals downstream of the resettable packer. In block 653, flowing well status is established with the resettable packer 5122 isolating one or more well intervals downstream of the resettable packer 5122. In block 655, once flow is established, the data analyzer 207 can be used to process the surface flow rate measurements output by the multiphase flow meter 203 and the downhole pressure measurements output by the downhole pressure sensor(s) 209 in order to analyze the produced fluid 130 and characterize the outflow of return fluid to the surface over time. In block 657, the return fluid measurements of block 655 can be used to calculate and model the downhole contributions from all open intervals (i.e., the intervals upstream of the resettable packer 5122). Note that the model of block 657 is a combination or convolution of the return outflow from all open intervals (including the newly-opened interval) of the well, and these open intervals are different over the sequence of well intervals that are opened by the operations of the workflow. In block 659, the data analyzer 207 calculates the return outflow of the newly-opened interval (i.e., the interval upstream of the resettable packer 5122) by isolating the contribution of return outflow from the previous model (derived from the last iteration of block 657). The calculations of block 659 can involve subtracting the return outflow from the previous model (derived from the last iteration of block 657) from the return outflow of the model derived in block 657. Furthermore, in block 659, the data analyzer 207 derives local formation properties of the newly-opened interval (i.e., the interval upstream of the resettable packer 5122) based on the return outflow for the newly-opened interval, for example, by correlation, modeling or other suitable techniques.

Note that the operations of blocks 651 to 659 can be performed iteratively over a sequence of well intervals in order to derive local formation properties for each newly-opened interval. As each interval of the sequence is opened by movement and activation of the resettable packer, the new measurements of surface flow characteristics and downhole pressure measurements are used to update the calculations and model of block 657. Changes to the model between before and after opening the given interval can be used to isolate the contribution of return outflow for the newly-opened interval and derive local formation properties based thereon in block 659. The sequence of well intervals that are opened by the operations of FIG. 6B can be varied as desired. For example, the well intervals can be opened and characterized interval-by-interval from the heel to the toe of the well.

FIG. 7A illustrates a workflow that employs a choking packer that can be located at a desired position in the horizontal section 5000 of FIG. 5A. The choking packer is similar to the resettable packer 5122 of FIGS. 5B-5D with one or more seal element(s) that are configured to have a choking effect on the produced fluid coming from below the choking packer (instead of providing an isolating seal interface between well intervals above and below the packer 5122 as described above). Specifically, the seal element(s) can be configured with an outside diameter that is close to but less than the internal diameter of the production tubing (e.g., liner/casing) of the horizontal section 5000. With the choking packer set in place, the seal element(s) of the choking packer will have a choking effect on the produced fluid coming from below the packer. In this configuration, downhole pressure sensors can measure differential pressure of the produced fluid across the choking packer. After setting the choking packer in place, the produced fluid that flows from the well to the surface facility can be analyzed together with the pressure measurements of the differential pressure of the produced fluid across the choking packer by the surface facility 200 of FIG. 2 in order to characterize local properties of the formation adjacent the particular well interval/choking packer. The workflow begins in block 701, where the choking packer is located and set at a desired position in a particular well interval that is in fluid communication with the surface facility 200.

In block 703, the data analyzer 207 can be used to process the surface flow rate measurements output by the multiphase flow meter 203 and the pressure measurements of the differential pressure of the produced fluid across the choking packer output by the downhole pressure sensors 209 in order to analyze the produced fluid and characterize one or more local formation properties (e.g., reservoir pressure, productivity index or skin) of the formation 5102 adjacent the particular well interval/choking packer.

In block 705, the data analyzer 207 stores in computer memory data representing the one or more local formation properties of the formation adjacent the particular well interval/choking packer for reservoir analysis and/or planning.

In block 707, it is determined whether to repeat the operations of blocks 701 to 705 for another well interval. The determination of block 707 can be performed in an automated manner by computer evaluation of one or more predefined conditions, in a manual manner by human analysis of the data or in a semi-automated manner involving both computer evaluation and human analysis. If so, the operations revert back to block 701 in order to repeat the operations of blocks 701 to 705. Otherwise, the workflow continues to block 709 where the choking packer is removed from the well and the workflow ends.

In one embodiment shown in FIG. 7B, the analysis begins in block 751 by moving the choking packer over one or more well intervals thereby un-choking one or more intervals upstream of the choking packer. In block 753, flowing well status is established. In block 755, once flow is established, the data analyzer 207 can be used to process the surface flow rate measurements output by the multiphase flow meter 203 and the downhole pressure measurements output by the downhole pressure sensor(s) 209 in order to analyze the produced fluid 130 and characterize the outflow of return fluid to the surface over time. In block 757, the return fluid measurements of block 755 can be used to calculate and model the downhole contributions from all intervals of the well. Note that the model of block 757 is a combination or convolution of the return outflow from all intervals of the well. Once the choking packer is moved below a given interval, the interval upstream of the choking packer (now un-choked) will provide an incremental gain to the fluid flow behavior of the well, which will affect the surface returns in terms of rate and pressure. In block 759, the data analyzer 207 calculates the return outflow of the interval(s) upstream of the choking packer (now un-choked) by isolating the incremental production gain of the newly un-choked interval(s) from the previous model (derived from the last iteration of block 757). The calculations of block 759 can involve subtracting the return outflow from the previous model (derived from the last iteration of block 757) from the return outflow of the model derived in block 757. Furthermore, in block 759, the data analyzer 207 derives local formation properties of the interval(s) upstream of the choking packer (now un-choked) based on the return outflow for the interval(s) upstream of the choking packer, for example, by correlation, modeling or other suitable techniques.

Note that the operations of blocks 751 to 759 can be performed iteratively over a sequence of well intervals in order to derive local formation properties for each newly un-choked interval. An initial model can be derived from the surface flow characteristics and downhole pressure measurements with the choking packer located upstream of the top well interval of the sequence. As each interval of the sequence is un-choked by movement of the choking packer, the new measurements of surface flow characteristics and downhole pressure measurements are used to update the calculations and model of block 757. Changes to the model between before and after un-choking the given interval can be used to isolate the contribution of return outflow for the un-choked interval and derive local formation properties based thereon in block 759. The sequence of well intervals that are un-choked by the operations of FIG. 7B can be varied as desired. For example, the well intervals can be un-choked and characterized interval-by-interval from the heel to the toe of the well.

FIG. 8 illustrates a surface facility 800 that analyzes flow characteristics of produced fluid that flows from a well traversing a hydraulically-fractured hydrocarbon-bearing formation (for example, the well of FIG. 1A or 5A) to the surface in order to detect and characterize slug flow originating from one or more well intervals and store in computer memory data related to such analysis for reservoir analysis and planning. The surface facility 800 includes a well-head choke and pressure sensor(s) 801, a multiphase flow meter 803, and a transient multiphase wellbore flow simulator 807. Optional equipment 815 for fluid sampling and analysis can be provided. One or more optional downhole pressure sensors 809 can also be provided. Produced fluid 830 can flow uphole through the production tubing of the well. At the surface, the produced fluid 830 flows from the platform through the well-head choke 801 and through the multiphase flow meter 803 for separation into various phases (solids, oil, gas, water) and storage by the fluid separation and storage stage 805. The produced fluid 830 can be supplied to the equipment 815 for fluid sampling and analysis. The multiphase flow meter 803 can be configured to measure the flow rates of different phases (e.g., oil, gas, water, solids) that make up the produced fluid 830 that returns to the surface. The oil and gas phases of the produced fluid 830 can originate from hydrocarbons that flow from the hydraulically-fractured formation into the production tubing of the well. The water phase of the produced fluid 830 can originate from water-based fracturing fluid or connate water that flows from the hydraulically-fractured formation into the production tubing of the well. The solid phase of the produced fluid 830 can originate from remnant proppant (e.g., sand) or possibly rock fragments flows from the hydraulically-fractured formation into the production tubing of the well. The produced fluid 830 can be generated as part of a flowback process that follows the hydraulic fracturing treatment of the well in preparation for cleanup and starting production from the well. Alternatively, the produced fluid 830 can be generated as part of a workover process in preparation for returning the well to production.

The choke 801 may include a variable sized aperture or orifice that is used to control fluid flow rate or downstream system pressure. As an example, the choke 801 may be provided in any of a variety of configurations (e.g., for fixed and/or adjustable modes of operation). As an example, an adjustable choke 801 may enable fluid flow and pressure parameters to be changed to suit process or production requirements. The choke 801 may be electrically or pneumatically operated.

The simulator 807 can interface to the well-head choke and pressure sensor(s) 801, the multiphase flow meter 803 and possibly the downhole pressure sensor(s) 809 via suitable data communication links (such as wired electrical communication links, wireless RF communication links, or optical communication links). The well-head pressure sensor(s) 801 can be configured to measure pressure of the produced fluid 830 at the well-head in real time (for example, pressure of the produced fluid 830 on both the upstream and downstream sides of the well-head choke). The surface-located multiphase flow meter 803 can be configured to measure flow rates of the various phases (oil/gas/water/solid) of the stream of produced fluid 830 produced from the well in real time. In one embodiment, the multiphase flow meter 803 may be a Model Vx Spectra multiphase flow meter supplied by Schlumberger Limited of Sugarland, Tex. The equipment 815 for fluid sampling and analysis can be configured to sample the produced fluid 830 produced from the well for chemical analysis. Such chemical analysis may include PVT analysis; electrical conductivity measurements using capacitive type devices; pH detection using ion selective electrodes, solid state detectors, or spectrophometric methods; flow-through spectrophotometric and infra-red spectroscopy cells; ion selective electrodes for specific ions, gas chromatography, gas detectors. The chemical analysis can generate data characterizing chemical properties of the produced fluid 830 or components thereof, such as conductivity, total dissolved solids (TDS), pH, temperature, total hardness, and total alkalinity. The chemical analysis can be carried out by the equipment 815 or by a local or remote testing laboratory.

The simulator 807 can control the operation of the choke 801 (e.g., vary the aperture size of the choke) to induce slug flow in the produce fluid 830. Alternatively, the produced fluid 830 can exhibit slug flow behavior without being induced by controlled behavior of the choke 801 but due to the downhole conditions of the well. In either case, the simulator 807 can process the multiphase flow rate measurements of the produced fluid 830 carried out by the surface-located multiphase flow meter 803 and possibly other measurements (such as the well-head pressure measurements carried out by the well-head pressure sensors 801, the downhole pressure measurements carried out by the optional downhole pressure sensor(s) 809, and the chemical analysis measurements of the produced fluid) in order to detect slug flow and characterize properties of the such slug flow (such as amplitude/frequency/period of slugs) over time and determine one or more intervals (e.g., zones) of the well that contribute to the slug flow. The simulator 807 can store in computer memory data that identifies the one or more intervals of the well that contribute to the slug flow and the underlying cause of the slug flow for reservoir analysis and planning (such as intervention or re-fracturing).

The simulator 807 can employ a model representing a system of equations that predict transient pressure distributions along the well and along hydraulic fractures in the reservoir and that predict distributions of oil/gas/water saturations along the well and along the hydraulic fractures. The model can determine the predicted pressure distributions and oil/gas/water saturation distributions over time in response to choke control operations that dictate the aperture size of the well head choke 801 over time. The predicted pressure distributions and oil/gas/water saturation distributions can be used to calculate determined production flow rates at the surface for oil/water/gas over time. The model can also possibly determine solid concentration and other properties in fractures and along the well. The model can also possibly be used to characterize the bottomhole pressure and associated drawdown pressure of the well over time.

In one embodiment, the model can solve for pressure drop (e.g., pressure differential) in the well, for example, through use of momentum equations. Such momentum equations, for example, may account for factors such as fluid potential energy (e.g., hydrostatic pressure), friction (e.g., shear stress between conduit wall and fluid), and acceleration (e.g., change in fluid velocity). As an example, one or more equations may be expressed in terms of static reservoir pressure, a flowing bottomhole pressure, wellhead pressure, and flowrates for different phases of produced fluids at the surface. As an example, equations may account for vertical, horizontal or angled arrangements of equipment. In another example, the model may implement equations that include dynamic conservation equations for momentum, mass and energy. As an example, pressure and momentum can be solved implicitly and simultaneously and, for example, conservation of mass and energy (e.g., temperature) may be solved in succeeding separate stages. Various examples of equations may be found in a dynamic multiphase flow simulator such as the simulator of the OLGA™ simulation framework (Schlumberger Limited, Houston, Tex.). OLGA, being a transient multi-phase wellbore flow simulator, can be used to calculate the bottomhole pressure at one or more bottomhole locations inside of the well. To do this, OLGA uses the three-fluid mathematical model that is originally developed and validated for the horizontal flow configurations. The mathematical model in OLGA simulator is summarized in K. Bendiksen et al, "The dynamic two-fluid model OLGA: theory and application," SPE Prod. Eng., 1991, pp. 171-180, herein incorporated by reference in its entirety. Typically, the boundary and initial conditions are specified before the simulation. The initial conditions include the distribution of phase volume fractions, velocities, pressure and other variables inside of the well. The boundary conditions typically include the wellhead pressure specified at the outlet of the well and no-flow boundary condition at the bottom of the well. The wellhead pressure can change over in time (transient) and hence specified as a series of time steps. Once these conditions are specified, the simulation is launched. In course of the simulation, the system of conservation equations can be solved over a number of time steps to derive the distribution of volume fractions, velocities, pressure (and other variables) in the well. Details of exemplary fluid models that can be used by simulator 807 are set forth in International Patent Application No. PCT/US2016/014424, herein incorporated by reference in its entirety.

In one embodiment, the simulator 807 can be embodied by the computer system 300 as described above with respect to FIG. 3.

During slug flow, the production flow rates at the surface for oil/water/gas over time together with other determined parameters (such as downhole pressure, well-head pressure(s)), and other fluid properties) as determined by the simulator 807 can be compared and matched to the corresponding actual measured values. For example, the predicted production flow rates at the surface for oil/water/gas over time as determined by the simulator 807 can be compared to the measured flow rates at the surface for oil/water/gas over time as output by the multiphase flow meter 803. In another example, downhole pressure(s) over time as determined by the simulator 807 can be compared to the measured downhole pressure(s) over time as output by the downhole pressure sensor(s) 809. In yet another example, well-head pressure(s) over time as determined by the simulator 807 can be compared to the measured well-head pressure(s) over time as output by the well-head pressure sensor(s) 801. Such comparisons can be used to refine or tune the model employed by the simulator 807 until a desired matching condition is obtained. Once the desired matching condition is obtained, the output of the simulator 807 can be used to determine one or more intervals (e.g., zones) of the well that contribute to the slug flow and possibly the underlying cause of such slug flow. The simulator 807 can store in computer memory data that identifies one or more intervals of the well that contribute to slug flow and the underlying cause of the slug flow for reservoir analysis and planning (such as intervention or re-fracturing).

FIG. 9 illustrates a workflow carried out by the transient multiphase wellbore flow simulator 807 of FIG. 8 that analyzes flow characteristics of produced fluid at the surface in order to detect slug flow, characterize the slug flow originating from one or more well intervals, determine the underlying cause of such slug flow, and store in computer memory data related to such analysis for reservoir analysis and planning. The workflow begins in block 901 where the simulator 807 optionally controls the well-head choke 801 in order to induce slug flow in the produced fluid. Alternatively, the produced fluid can exhibit slug flow behavior without being induced by controlled behavior of the choke 801 but due to the downhole conditions of the well.

In block 903, the simulator 807 analyzes the surface flow rate measurements for the phases of the produced fluid over time as output by the multiphase flow meter 803 in conjunction with other pressure measurements (e.g., pressure upstream and downstream of choke as measured by the well-head pressure sensor(s) 801, and downhole pressure measurements as measured by the downhole pressure sensor(s) 809) in order to detect slug flow in the produced fluid. For example, the slug flow can be detected by automatically checking for and detecting periodic oscillatory behavior in the surface flow rate measurements for the phases of the produced fluid over time and in the other pressure measurements over time.

In block 905, the simulator 807 checks whether slug flow has been detected in the produced fluid in block 903. If not, the operation returns back to block 903 to wait for the detection of slug flow. In the event that slug flow is detected, the operations continue to block 907.

In block 907, the simulator 807 analyzes the surface flow rate measurements for the phases of the produced fluid over time as output by the multiphase flow meter 803 in conjunction with other measurements (e.g., pressure upstream and downstream of choke as measured by the well-head pressure sensor(s) 801, downhole pressure measurements as measured by the downhole pressure sensor(s) 809, chemical analysis measurements, etc.) in order to characterize properties of the slug flow (such as amplitude/frequency/period of slugs) over time and determine one or more intervals (e.g., zones) of the well that contribute to the slug flow.

In one embodiment, as part of block 907, the simulator 807 can derive the amplitude/frequency/period of slugs, individual phase flowrates and PVT properties observed at the surface, and use such data as input data for the solution. From the solution, the wellbore volume necessary to obtain the observed slug flow is calculated. The additional consideration of slip between phases allows to estimate the location, cross-section and the total length of the well interval that contributes to the slug flow. These properties can be computed for the transient flow using algorithms available in commercial software packages such as OLGA.

In another embodiment, as part of block 907, the simulator 807 can determine production flow rates at the surface for oil/water/gas over time together with other determined parameters (such as downhole pressure(s), well-head pressure(s)), other fluid properties, etc.) for varying geometrical properties of the well. These determined parameters (e.g., simulated production flow rates, downhole pressure(s), well-head pressure(s), fluid properties, etc.) for the varying geometrical properties of the well as determined by the simulator 807 can be compared to corresponding measured parameters to determine whether a sufficient match is obtained. The geometry of the well can be estimated when the sufficient match is obtained. The location, cross-section and the total length of the well interval that contributes to the slug flow can be determined from the estimated geometry of the well. It is found that the amplitude and frequency of the slugs at surface is a strong function of the position along the well at which the slug originates, both because of the length it has to travel before reaching the surface and also the effect of the possible undulations of the lateral portion of the well, as those may act as a kind of separator, amplifying the amplitude of the slugs. Matching predicted slug amplitude and frequency at surface with measured surface amplitude and frequency for a given wellbore trajectory allows the determination of the location of origin of the slugs.

In block 909, the simulator 807 can analyze the measurements over time in order to determine the underlying cause of the slug flow (such as depleted formation or well damage/fracture collapse). Given the PVT properties of the produced hydrocarbon, there is a minimum downhole pressure that is required to generate slugs. If it is predicted or measured that this pressure level is not reached inside the wellbore, then it has to be reached inside the fracture, indicating that the fracture is intersecting a depleted zone.

In block 911, the simulator 807 stores in computer memory data that identifies the one or more intervals of the well that contribute to slug flow as determined in block 907 and the underlying cause of the slug flow as determined in block 909 for reservoir analysis and planning (such as intervention or re-fracturing).

In one embodiment shown in FIGS. 10A and 10B, a BHA 1122 can be moved along the sequence of intervals and associated sliding sleeves 1110 of a well to clean out the intervals of the well. The well includes a surface-located platform and derrick and vertical casing similar to the well of FIG. 1A that are not shown for the sake of simplicity of description. As shown in FIG. 10B, the BHA 1122 includes a top connection 1502 for connection to the tubing 106 and may comprise a mechanical, or hydraulic disconnect as are commonly known. The BHA 1122 includes one or more circulation and orifice subs (one shown as 1518) that provide a supply of fluid for the clean out operations as discussed further herein. The BHA 1122 can optionally include the shifting tool 200 as described herein. The circulation and orifice sub may be provided on either side of the shifting tool 200. The BHA 1122 can also optionally include a jetting tool (not shown) below the shifting tool 200, where the jetting tool includes jetting ports to provide a jet of high pressure liquid to puncture holes within the production tubing of the well. The BHA 1122 may also optionally include a production packer (not shown) for engagement and sealing upon the casing during jetting operations. The BHA 1122 may also optionally include a bull nose (not shown) at the end of the tool assembly although it will be appreciated that the bull nose may be omitted or replaced with other equipment as desired. Note that sand, proppant, rock fragments and/or other solid debris can be deposited in the wellbore of one or more intervals of the well prior to the clean out operations. The circulation and orifice sub(s) of the BHA 1122 provides a supply of fluid that can mobilize such solids, and the mobilized solids can be carried in the return fluid that returns to the surface as shown in FIG. 10A. The return fluid can also carry solids (e.g., sand, proppants, and rock fragments) that are produced from the fractures (and possibly the adjacent formation) in fluid communication with open sliding sleeves that are upstream and possibly downstream of the BHA 1122 as shown. As part of the clean out operations, one or more parameters that characterize solids production over the intervals and associated sliding sleeves of the well can be calculated as the BHA 1122 is moved along the sequence of intervals during the workflow that cleans out the intervals of the well. The one or more parameters that characterize solids production of the intervals and associated sliding sleeves of the well can be used to dynamically control the operations and/or plan the next treatment of the well to reduces solids production of the well (if need be) and/or plan production strategies for the well that reduces solids production of the well (if need be).

FIG. 11 illustrates a workflow carried out by the data analyzer 207 of FIG. 2 to analyze the flow characteristics of return fluid during clean out operations over one or more intervals of a well. The workflow begins in block 1101 where the BHA 1122 is moved past a particular sliding sleeve of the well with the supply of fluid to and from the BHA 1122 established for clean out of solids above and/or below the particular sliding sleeve. In this block 1101, the supplied fluid can mobilize solids near the particular sliding sleeve, and the mobilized solids can be carried in the return fluid that returns to the surface. The return fluid can also carry solids that are produced from the fractures (and possibly the adjacent formation) that are in fluid communication with the open sliding sleeves upstream and downstream of the BHA tool position. In block 1103, the data analyzer 207 can measure the surface flow rate of solids that are part of return fluid over time and use the measure flow rate of solids to determine measured solid production for the intervals and associated slide sleeves of the well as a function of the location of the BHA 1122. The data analyzer 207 can optionally use downhole pressure measurements to correct measured flow rates in order to account for leakoff of the supplied fluid into the fractures and/or formation. In block 1105, the data analyzer 207 derives a model of solids production for the intervals and associated sliding sleeves of the well based on position (depth) of the BHA 1122 in the well. In block 1107, the data analyzer 207 solves the model of solids production as derived in the block 1105 for the current location of the BHA 1122 using the measured solid production as determined in block 1103 for the current location of the BHA 1122 as a constraint in order to solve for parameters of the model. In block 1109, the data analyzer 207 can employ the model parameters solved in block 1107 to derive parameters that characterize solids production for the particular sliding sleeve, such as volume of solids produced from fractures and/or the formation in fluid communication with the particular sliding sleeve.

Note that the operations of blocks 1101 to 1109 can be performed iteratively over a sequence of sliding sleeves for the intervals of the well order to derive the parameters that character solids production over the sliding sleeves and associated intervals of the well. For example, the parameters can be combined to determine a profile of solids production over the sequence of sliding sleeves and associated intervals of the well. For example, the profile of solids production can include volume of solids produced from fractures over well depths that encompass the sequence of sliding sleeves as well as a mass distribution of deposited solids over one or more intervals of the well. The sequence of sliding sleeves and corresponding intervals that are cleaned out can be varied as desired. For example, the well intervals and corresponding sliding sleeves can be cleaned out from the heel to the toe of the well or vice versa.

In one example where the BHA 1122 supplies fluid to the wellbore in an underbalanced condition (i.e., less than the formation pressure) for clean out, the production of solids from fractures that are in communication with a sliding sleeve can be described by an exponentially decreasing function of the form:

$$U_{sand} = A_i e^{-\alpha_i t} \qquad \text{Eqn. (1)}$$

where $U_{sand}$ is the rate of solids production (e.g., kg/min) from the i-th sliding sleeve of the well,
$A_i$ and $\alpha_i$ are coefficients of the exponentially decreasing function, and
t represents the time after the location of the BHA passes the i-th sliding sleeve.

Note that Eqn. (1) can also describe the production of solids from fractures that are in communication with a sliding sleeve located above the position of the BHA 1122.

We also assume that solids may be deposited in the wellbore next to each sleeve (or between sleeves), where such solids have a distribution described by an exponentially decreasing function of the form:

$$\overline{m}_{sand} = B_i e^{-\beta_i(x-x_i)^2} \qquad \text{Eqn. (2)}$$

where $\overline{m}_{sand}$ is the solid distribution (e.g., kg/m) along the wellbore next to the i-th sliding sleeve,
$B_i$ and $\beta_i$ are coefficients of the exponentially decreasing function,
x is the location (depth) of the BHA tool, and
$x_i$ is the location (depth) of the sand deposit for the i-th sliding sleeve.

We can also assume that no solids production occurs from the sleeves below the BHA 1122, which is typically correct for slightly underbalanced types of clean out operations as well as balanced and overbalanced type of clean out operations.

Under these assumptions, a profile of solids concentration as the BHA 1122 is moved along the sliding sleeves of the well can be described by the following parametric equation:

$$C_{solids} = \frac{1}{\text{pump rate}}$$

$$\sum_{i=1}^{N} \left\{ \begin{array}{l} A_i e^{-\alpha_i \left[ \frac{x - y_i}{BHA_{Speed}} - \frac{(y_i - y_1) \times AVC}{\text{pump rate}} \right]}; \text{ if } x \geq y_i \text{ and } \\ \left[ \frac{x - y_i}{BHA_{Speed}} - \frac{(y_i - y_1) \times AVC}{\text{pump rate}} \right] \geq 0 \\ 0; \text{ if } x < y_i \text{ or } \left[ \frac{x - y_i}{BHA_{Speed}} - \frac{(y_i - y_1) \times AVC}{\text{pump rate}} \right] < 0 \end{array} \right\} +$$

$$\frac{BHA_{Speed}}{\text{pump rate}} \sum_{i=1}^{N} \left[ B_i e^{-\beta_i \left( \frac{x + y_1 \frac{BHA_{Speed} \times AVC}{\text{pump rate}}}{1 + \frac{BHA_{Speed} \times AVC}{\text{pump rate}}} - x_i \right)^2} \right] \qquad \text{Eqn. (3)}$$

where $C_{solids}$ is solids concentration (kg added to cubic meters) for a given location (depth) x of the BHA as the BHA is moved along the sliding sleeves of the well,
$A_i$ and $\alpha_i$ are coefficients of the exponentially decreasing function of the first summation term,
$B_i$ and $\beta_i$ are coefficients of the exponentially decreasing function of the second summation term,
x is the location (depth) of the BHA,
$y_i$ is the location (depth) of i-th sliding sleeve,
$y_1$ is the location (depth) of the 1st sliding sleeve,
$x_i$ is the location (depth) of the sand deposit for the i-th sliding sleeve,
pump rate (e.g., cubic meters/min) is the rate of supply of fluid to the BHA,
$BHA_{speed}$ is the speed of the BHA as it moves along the sliding sleeves of the well, and
AVC is the volume capacity (e.g., in cubic meters/m) of the annulus that carries the return fluid to the surface, which can be determined from the external diameter of the tubing that runs the BHA tool and the internal wellbore diameter/casing of the well.

In this Eqn. (3), the solids concentration $C_{solids}$ represents the contribution of solids from all open sliding sleeves of the well. The first summation term is derived from the exponentially decreasing function of Eqn. (1) and represents the contribution of solids that are produced from the fractures that are in fluid communication with the open sliding sleeves of the well. The second summation term is derived from the exponentially decreasing function of Eqn. (2) and represents the contribution of deposited solids near (or between) the sliding sleeves of the well.

The parametric equation of Eqn. (3) can be used as the model of solid production of block 1105 for the workflow of FIG. 11. The measured solids concentration of block 1103 can be used as a constraint to find a best-fit solution to the parametric equation of Eqn. (3) as the BHA 1122 is moved along the sliding sleeves of the well. The solution provides values for the coefficients $A_i$, $\alpha_i$, $B_i$, $\beta_i$, and $x_i$ of the parametric equation of Eqn. (3) for a sequence of sliding sleeves of the well. The solved-for values can be used to derive parameters that characterize the solids production from each sliding sleeve. In one example, these parameters can include a total volume of solids produced from the fractures of a given sliding sleeve, which can be calculated as:

$$V_{solids_i} = \frac{A_i}{\alpha_i}. \qquad \text{Eqn. (4)}$$

The parameters $V_{solids_i}$ of Eqn. (4) for the sequence of sliding sleeves can be combined to determine a profile of solids production over the sequence of sliding sleeves of the well. For example, the profile of solids production can include the volume of solids produced from fractures and/or formation over well depths that encompass the sequence of sliding sleeves as derived from the parameters $V_{solids_i}$ for the sequence of sliding sleeves.

The parameters of the model can also provide a mass distribution of solids over one or more intervals of the well, which can be calculated as:

$$\overline{M}_{solids} = \sum_{i=1}^{N} B_i e^{-\beta_i (x-x_i)^2}. \quad \text{Eqn. (5)}$$

FIGS. 12A and 12B are plots that illustrate the data processing operations of the data analyzer during an exemplary slightly underbalanced clean out operation according to the workflow of FIG. 11. In this example, the clean out operation is performed on a well over a sequence of five sleeves at depths ranging from 2000-2500 m with a pumping rate of fluid of 0.5 m3/min. The annulus volume capacity of the well was 0.07854 m3/m which corresponds to internal wellbore diameter of 0.112 m and tubing external diameter of 0.0508 m. (model data). The five perforation clusters are located at depths of 2030, 2130, 2230, 2330 and 2430 m.

FIG. 12A show a plot of the measured solid concentration as derived in block 1103 as function of BHA location (depth) in the well, which is labeled "measured sand conc." It also shows a plot of the modeled sand concentration as derived in block 1105 as a function of BHA location (depth) in the well, which is labeled "sand concentration." It also shows a plot of total solids volume, labeled "total sand volume."

FIG. 12B shows a plots that represent a profile of solids production over the sequence of five sliding sleeves as derived from the model fitting and calculations of blocks 1107 and 1109. The plots labeled "sand flowed back" represent the volume of solids (in kg) produced from fractures over well depths that encompass the sequence of five sliding sleeves as derived from the parameters $V_{solids_i}$ of the sequence of sliding sleeves. And the plots labeled "sand distribution" represent the mass distribution (in kg/meter) of deposited solids over well depths that encompass the sequence of five sliding sleeves as derived by the parameter $\overline{M}_{solids}$ of Eqn. (5).

Note that the parameter(s) that characterize solids production of the intervals and associated sliding sleeves of the well can be used to dynamically control the operation of the clean out operation. For example, the parameter(s) that characterize the solids produced from fractures can be used to control the pumping rate of the fluid supplied downhole for balanced return where there is little or no solid produced from the fractures during the clean out operation.

In other cases, the return rate can be higher than the pumping rate of the fluid supplied downhole and spikes in the solid concentration in the return fluid can be attributed to both deposited solids from the wellbore and solid production from fractures. The maximum possible solid produced from a sliding sleeve can be computed as an excess between total local solid production and volumes of sand that can be accumulated in the wellbore. For example, for a wellbore section with length of 10 m and internal diameter of 0.1 m having one perforated cluster and produced sand volume of 500 kg, the potential maximum volume of sand with a specific gravity of 2.65 and bulk density of 1.6 g/cm3 produced from such sliding sleeve can be estimated as 500–3.14*(0.1)^2/4/1000*1.6=374 kg. The maximum volume can be used as a constraint whereby measured solid volumes above this limit can be attributed to solids produced from fractures or the formation (and not from deposited sand in the wellbore).

There have been described and illustrated herein several embodiments of methods and systems for analysis of hydraulically-fractured reservoirs. While particular embodiments have been described, it is not intended that the disclosure be limited thereto, as it is intended that the disclosure be as broad in scope as the art will allow and that the specification be read likewise. For example, while particular types of well designs and well completions have been disclosed, it will be understood that other types of well designs (including vertical wells and multilateral horizontal wells) and other types of well completions (including different casing and liner configurations and different production tubing configurations and different perforation configurations) can be used. Multilateral wells include multi-branched wells, forked wells, wells with several laterals branching from one horizontal main wellbore, wells with several laterals branching from one vertical main wellbore, wells with stacked laterals, and wells with dual-opposing laterals. It will therefore be appreciated by those skilled in the art that yet other modifications could be made to the provided disclosure without deviating from its spirit and scope as claimed.

What is claimed is:

1. A method for characterizing a hydraulically-fractured hydrocarbon-bearing formation that is traversed by a well having a plurality of fracturing sleeves, the method comprising:
   i) using a downhole tool to open or close a set of one or more fracturing sleeves of the well;
   ii) after opening or closing the set of one or more fracturing sleeves of the well, analyzing surface flow characteristics of produced fluid that flows from the well back to a surface-located facility; and
   iii) deriving at least one local formation property that characterizes the hydraulically-fractured formation adjacent the set of one or more fracturing sleeves of the well based on the surface flow characteristics.

2. The method of claim 1, wherein:
the surface flow characteristics of the produced fluid are measured by a surface-located multiphase flow meter.

3. The method of claim 1, wherein:
the surface flow characteristics of the produced fluid comprise flow rates for different phases of the produced fluid.

4. The method of claim 3, wherein:
the different phases of the produced fluid are selected from the group consisting of: an oil phase, a gas phase, a water phase and a solid phase.

5. The method of claim 1, wherein:
the surface flow characteristics of the produced fluid are analyzed to determine at least one flow contribution that flows through the set of one or more fracturing sleeves of the well, and the flow contribution is used to derive the at least one local formation property that characterizes the hydraulically-fractured formation adjacent the set of one or more fracturing sleeves of the well.

6. The method of claim 5, wherein:
the surface flow characteristics of the produced fluid are analyzed together with downhole pressure measurements of the produced fluid in order to determine the at least one flow contribution that flows through the set of one or more fracturing sleeves of the well.

7. The method of claim 6, wherein:
modeling and nodal analysis is used to analyze the surface flow characteristics of the produced fluid and the downhole pressure measurements of the produced fluid in order to determine the at least one flow contribution that flows through the set of one or more fracturing sleeves of the well.

8. The method of claim 1, wherein:
the at least one local formation property that characterizes the hydraulically-fractured formation adjacent the set of one or more fracturing sleeves of the well is evaluated in order to determine whether to selectively close or open the set of one or more fracturing sleeves of the well.

9. The method of claim 8, wherein:
in the event that the at least one local formation property that characterizes the hydraulically-fractured formation adjacent the set of one or more fracturing sleeves of the well provides an indication of a depleted formation or formation or well damage, the set of one or more fracturing sleeves of the well are closed or left closed.

10. The method of claim 1, further comprising:
repeating operations of i) through iii) for at least one additional set of one or more fracturing sleeves of the well in order to derive at least one local formation property that characterizes the hydraulically-fractured formation adjacent the at least one additional set of one or more fracturing sleeves of the well.

11. A method for characterizing a hydraulically-fractured hydrocarbon-bearing formation that is traversed by a well that is partitioned into a plurality of well intervals, the method comprising:
  i) using a downhole packer to isolate a set of one or more well intervals that are upstream from the packer from one or more well intervals that are downstream from the packer, wherein the set of one or more well intervals that are upstream from the packer are in fluid communication with a surface facility, while the one or more well intervals downstream from the packer are fluidly isolated and decoupled from the surface facility;
  ii) after isolating the set of one or more well intervals that are upstream from the packer, analyzing surface flow characteristics of produced fluid that flows from the well back to the surface facility; and
  iii) deriving at least one local formation property that characterizes the hydraulically-fractured formation adjacent the set of one or more well intervals that are upstream from the packer based on the surface flow characteristics.

12. The method of claim 11, wherein:
the surface flow characteristics of the produced fluid are measured by a surface-located multiphase flow meter.

13. The method of claim 11, wherein:
the surface flow characteristics of the produced fluid comprise flow rates for different phases of the produced fluid.

14. The method of claim 13, wherein:
the different phases of the produced fluid are selected from the group consisting of: an oil phase, a gas phase, a water phase and a solid phase.

15. The method of claim 11, wherein:
the surface flow characteristics of the produced fluid are analyzed to determine at least one flow contribution that flows through the set of one or more well intervals that are upstream from the packer, and the flow contribution is used to derive the at least one local formation property that characterizes the hydraulically-fractured formation adjacent the set of one or more well intervals that are upstream from the packer.

16. The method of claim 15, wherein:
the surface flow characteristics of the produced fluid are analyzed together with downhole pressure measurements of the produced fluid in order to determine the at least one flow contribution that flows through the set of one or more well intervals that are upstream from the packer.

17. The method of claim 16, wherein:
modeling and nodal analysis is used to analyze the surface flow characteristics of the produced fluid and the downhole pressure measurements of the produced fluid in order to determine the at least one flow contribution that flows through the set of one or more well intervals that are upstream from the packer.

18. The method of claim 11, wherein:
the at least one local formation property that characterizes the hydraulically-fractured formation adjacent the set of one or more well intervals that are upstream from the packer is evaluated in order to determine whether to selectively seal the set of one or more well intervals that upstream from the packer.

19. The method of claim 18, wherein:
in the event that the at least one local formation property that characterizes the hydraulically-fractured formation adjacent the set of one or more well intervals that are upstream from the packer provides an indication of a depleted formation or formation or well damage, the set of one or more well intervals that are upstream from the packer are sealed by application of a sealing agent; otherwise, a set of one or more fracturing sleeves of the well are opened or left opened.

20. The method of claim 11, further comprising:
repeating operations of i) through iii) for at least one additional set of one or more well intervals in order to derive at least one local formation property that characterizes the hydraulically-fractured formation adjacent the at least one additional set of one or more well intervals.

21. A method for characterizing a hydraulically-fractured hydrocarbon-bearing formation that is traversed by a well that is partitioned into a plurality of well intervals, the method comprising:
  i) locating a downhole choking packer in a particular well interval;
  ii) after locating the choking packer in the particular well interval, analyzing surface flow characteristics of produced fluid that flows from the well back to the surface facility; and
  iii) deriving at least one local formation property that characterize the hydraulically-fractured formation adjacent the particular well interval based on the surface flow characteristics.

22. The method of claim 21, wherein:
the surface flow characteristics of the produced fluid are measured by a surface-located multiphase flow meter.

23. The method of claim 21, wherein:
the surface flow characteristics of the produced fluid comprise flow rates for different phases of the produced fluid.

24. The method of claim 23, wherein:
the different phases of the produced fluid are selected from the group consisting of: an oil phase, a gas phase, a water phase and a solid phase.

25. The method of claim 21, wherein:
the surface flow characteristics of the produced fluid are analyzed together with downhole differential pressure measurements of the produced fluid across the choking packer in order to derive the at least one local formation property that characterize the hydraulically-fractured formation adjacent the particular well interval.

26. The method of claim 21, further comprising:
repeating operations of i) through iii) for at least one additional well interval in order to derive at least one local formation property that characterizes the hydraulically-fractured formation adjacent the at least one additional well interval.

27. A method for characterizing a hydraulically-fractured hydrocarbon-bearing formation that is traversed by a well that is partitioned into a plurality of well intervals, the method comprising:
- analyzing surface flow characteristics of produced fluid that flows from the well back to a surface-located facility over time in order to detect slug flow in the produced fluid and determine properties of the slug flow;
- analyzing the properties of the slug flow or the surface flow characteristics of produced fluid over time to determine one or more well intervals that contribute to the slug flow; and
- storing data in computer memory that identifies the one or more well intervals that contribute to the slug flow.

28. The method of claim 27, wherein:
the properties of the slug flow are selected from the group consisting of amplitude, frequency and period characteristic of the slug flow.

29. The method of claim 27, wherein:
the surface flow characteristics of the produced fluid are measured by a surface-located multiphase flow meter.

30. The method of claim 27, wherein:
the surface flow characteristics of the produced fluid comprise flow rates for different phases of the produced fluid.

31. The method of claim 30, wherein:
the different phases of the produced fluid are selected from the group consisting of: an oil phase, a gas phase, a water phase and a solid phase.

32. The method of claim 27, wherein:
the surface flow characteristics of the produced fluid are analyzed together with downhole pressure measurements in order to determine one or more well intervals that contribute to the slug flow.

33. The method of claim 27, wherein:
a transient multiphase wellbore flow simulator is used to analyze the properties of the slug flow or the surface flow characteristics of produced fluid over time to determine one or more well intervals that contribute to the slug flow.

34. The method of claim 33, wherein:
the transient multiphase wellbore flow simulator derives a solution using properties of the slug flow (including individual phase flowrates) as input data, calculates a wellbore volume from the solution, and estimates properties (such as location, cross-section and the total length) of the well interval that contributes to the slug flow based on the wellbore volume.

35. The method of claim 33, wherein:
the transient multiphase wellbore flow simulator determines individual phase flow rates at the surface together with other determined parameters (such as downhole pressure(s), wellhead pressure(s)), other fluid properties, etc.) for varying geometrical properties of the well, compares these determined parameters for the varying geometrical properties of the well to corresponding measured parameters to determine whether a sufficient match is obtained, estimates the geometrical properties of the well when the sufficient match is obtained, and estimates properties (such as location, cross-section and the total length) of the well interval that contributes to the slug flow based on the estimated geometry of the well.

36. The method according to claim 27, further comprising:
analyzing the properties of the slug flow or the surface flow characteristics of produced fluid over time to determine underlying cause the slug flow; and storing data in computer memory that identifies the underlying cause of the slug flow.

37. A method for characterizing a hydraulically-fractured hydrocarbon-bearing formation that is traversed by a well that is partitioned into a plurality of well intervals, the method comprising:
i) locating a downhole tool in a particular well interval where the downhole tool circulates fluid for clean out of the particular well interval;
ii) analyzing surface flow characteristics of produced fluid that flows from the well back to a surface-located facility; and
iii) deriving at least one property that characterizes solids production from the particular well interval based on the surface flow characteristics.

38. The method of claim 37, wherein:
the surface flow characteristics of the produced fluid are measured by a surface-located multiphase flow meter.

39. The method of claim 37, wherein:
the well comprises at least one sliding sleeve; and
the at least one property of iii) characterizes solids production from fractures, formations, or both that are in fluid communication with a particular sliding sleeve.

40. The method of claim 39, wherein:
the at least one property of iii) further characterizes a profile of solids production from fractures, formations, or both that are in fluid communication with a number of sliding sleeves of the well.

41. The method of claim 37, further comprising:
iv) deriving at least one property that characterizes a profile of solids production along one or more intervals based on the surface flow characteristics.

42. The method of claim 41, wherein:
the at least one property of iv) characterizes a profile of deposited solids along one or more intervals of the well.

* * * * *